United States Patent [19]

Sasaki et al.

[11] 4,362,076

[45] Dec. 7, 1982

[54] ELECTROSTATIC COPYING APPARATUS

[75] Inventors: Koichi Sasaki, Osaka; Yasuji Sumida, Nara; Hiroshi Ishida, Ibaragi, all of Japan

[73] Assignee: Mita Industrial Company Limited, Osaka, Japan

[21] Appl. No.: 171,541

[22] Filed: Jul. 23, 1980

Related U.S. Application Data

[62] Division of Ser. No. 29,053, Apr. 11, 1979, Pat. No. 4,295,731.

[30] Foreign Application Priority Data

| | | | |
|---|---|---|---|
| Apr. 17, 1978 | [JP] | Japan | 53-45490 |
| Apr. 17, 1978 | [JP] | Japan | 53-50972 |
| Apr. 17, 1978 | [JP] | Japan | 53-50973 |
| Apr. 19, 1978 | [JP] | Japan | 53-47309 |
| May 23, 1978 | [JP] | Japan | 53-61822 |
| May 23, 1978 | [JP] | Japan | 53-70043 |
| May 23, 1978 | [JP] | Japan | 53-70044 |
| May 23, 1978 | [JP] | Japan | 53-70045 |
| May 23, 1978 | [JP] | Japan | 53-70046 |
| May 23, 1978 | [JP] | Japan | 53-70047 |
| May 30, 1978 | [JP] | Japan | 53-65949 |
| May 30, 1978 | [JP] | Japan | 53-74580 |
| May 30, 1978 | [JP] | Japan | 53-74581 |
| May 30, 1978 | [JP] | Japan | 53-74582 |
| May 31, 1978 | [JP] | Japan | 53-66119 |

[51] Int. Cl.$^3$ .......................... B23D 25/16; B26D 1/62

[52] U.S. Cl. .......................................... 83/285; 83/283; 83/335; 83/342; 83/349; 83/524; 83/526; 83/548; 83/572; 355/13; 355/29

[58] Field of Search ............... 355/13, 28, 29; 83/285, 83/203-205, 283, 334-335, 342, 349, 524, 526, 571-573, 593, 548

[56] References Cited

U.S. PATENT DOCUMENTS

| | | | |
|---|---|---|---|
| 2,191,212 | 2/1940 | Landrolk et al. | 83/203 |
| 3,272,043 | 9/1966 | Ryan | 83/335 |
| 3,289,532 | 12/1966 | Baumgarten et al. | 355/28 |
| 3,613,491 | 10/1971 | Kahmann | 83/572 |
| 4,143,570 | 3/1979 | Fujimoto et al. | 83/205 |

*Primary Examiner*—Stephen G. Kunin
*Assistant Examiner*—K. Bradford Adolphson
*Attorney, Agent, or Firm*—Wenderoth, Lind & Ponack

[57] ABSTRACT

A cutting apparatus for an electrostatic copying machine includes a fixed blade having a straight cutting edge, a rotary shaft mounted for rotation on the frame of the machine, and a rotary fixed to an carried by the rotary shaft, the rotary blade having a spirally curved cutting edge. A wrap spring clutch is capable of transmitting rotation of a continually rotating gear to the rotary shaft and rotary blade. The wrap spring clutch is prevented from operation by a control cog of a double cog member. An inclinable member operates the double cog member to release the wrap spring clutch to enable rotation of the rotary shaft and rotary blade. The double cog member has a rotation lock cog which stops the wrap spring clutch after a predetermined rotation of the rotary shaft and rotary blade.

2 Claims, 44 Drawing Figures

ELECTROSTATIC COPYING APPARATUS

This is a division of application Ser. No. 29,053, filed Apr. 11, 1979, now U.S. Pat. No. 4,295,731.

BACKGROUND OF THE INVENTION

1. Field of the Invention

The present invention relates to an electrostatic copying apparatus of the type in which a copying paper wound in a roll-like form is utilized, and an endless loop is provided about a pair of wheels rotated in one direction so as to cause part of an optical device or an original document carrier to travel reciprocally during a copying operation.

2. Description of the Prior Art

In a typical prior art arrangement, timing control to achieve various copying operation modes such as copying paper feeding, exposure, and copying paper cutting is performed by employment of electrical circuits and microswitches which are actuated by the moving part of the optical device or the original document carrier. It is difficult to check by the eye-ball observation whether or not the timing control is performed precisely. Further, adjustment and maintenance of such prior art assembly are rather difficult.

SUMMARY OF THE INVENTION

By means of the concept of the invention, the above-mentioned shortcomings of the prior art are avoided and there is provided an electrostatic copying apparatus in which precise checking, easier adjustment and maintenance of the timing control are achieved.

In accordance with the invention, there is provided a moving member affixed to part of the optical device including an exposure lamp or original document carrier. The part of the optical device or the original document carrier are linked to an endless loop provided about a pair of wheels rotating in one direction, so that the part of the optical device or the original document carrier travels reciprocally. A paper feed detecting member, an exposure detecting member, a paper cut detecting member, and a de-energization detecting member are disposed in this order along the passage of the moving member, and are spring-biased to be in contact with the moving member to swing individually. A copying paper feed linkage is operatively connected with respect to the paper feed detecting member, and actuates a paper feed device to feed the copying paper. An exposure linkage is associated with the detecting member to cause an exposure lamp to be energized, and is further associated with the de-energization detecting member for causing the lamp to be de-energized. A paper cut linkage is associated with the paper cut detecting member to actuate a paper cut device for severing the copying paper traveling from the paper feed device.

By means of such arrangement, timing control of copying operation modes are performed by mechanical structures, and thus precise checking of the timing control by eye-ball observation is possible, and adjustment and maintenance of the timing control is conducted easily.

Accordingly, it is an object of this invention to provide an improved electrostatic copying apparatus including an improved paper cutting device.

It is another object of the invention to provide such an improved electrostatic copying apparatus enabling precise checking of timing control of copying operation modes, including cutting of paper.

It is still another object of the invention to provide such an improved electrostatic copying apparatus wherein easier adjustment and maintenance of the timing control are achieved.

These and other objects of the invention will become apparent from the following description, taken together with the accompanying drawings.

BRIEF DESCRIPTION OF THE DRAWINGS

A detailed description of the invention will be made with reference to the accompanying drawings, wherein like numerals designate corresponding parts in the various figures, and wherein.

DESCRIPTION OF THE PREFERRED EMBODIMENT

Figure 1:
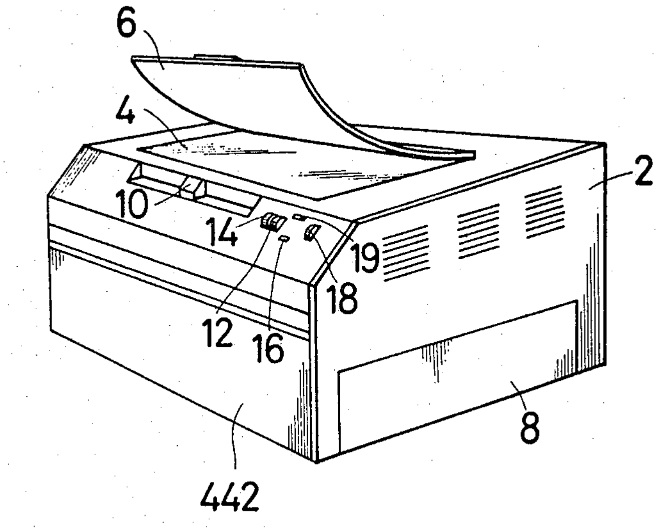
FIG. 1 is a perspective view of an electrostatic copying apparatus according to this invention.

FIG. 1 is a perspective view of an electrostatic copying apparatus according to this invention. A top machine frame 2 is provided with a transparent plate 4 for supporting thereon an original document to be copied. The machine frame 2 is equipped with an original document cover lid 6 which presses the original document upon the transparent plate 4. A copying paper feed device 8 which supplies a roll-like photosensitive copying paper 20 (shown later) is assembled into the machine frame 2 as illustrated in FIG. 1. This paper feed device 8 can be drawn out from the machine frame 2 in the rightward direction as viewed in FIG. 1. The length of copying paper discharged from the machine frame 2 upon completion of copying can be freely selected by sliding the knob 10, which is projecting from the front of the machine frame 2, manually in the lateral direction of the machine frame 2, and the length corresponds to the selected position of knob 10. The number of copies to be taken can be pre-set by two-digit display drums 12 and 14 provided in the upper front part of the machine frame 2. In a copying operation, first the number of copies is set by display drums 12 and 14, then a print button 16 is pressed. The contrast of the picture appearing on the copying paper can be adjusted by a rotatable knob 18. If the copying paper jams within the apparatus, a jamming alarm lamp 19 will light up.

Figure 2:
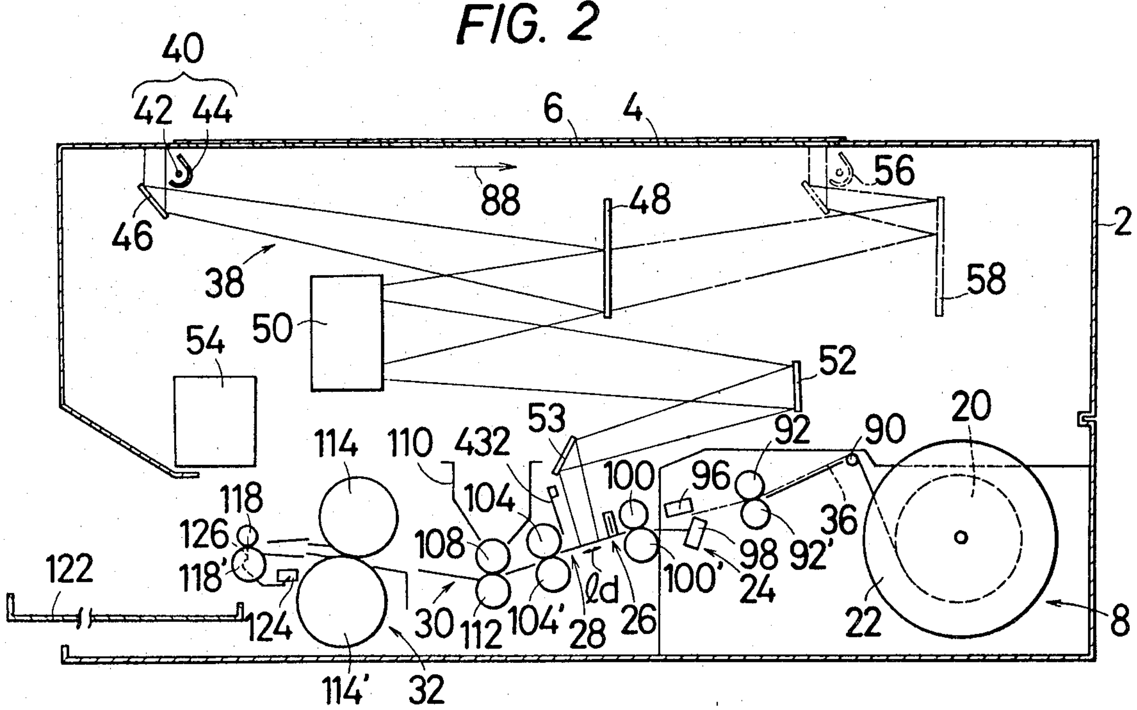
FIG. 2 is a schematic longitudinal sectional view of the front side of the copying apparatus shown in FIG. 1.

Referring to FIG. 2, the copying paper passage is composed of the paper feed device 8 which houses a holder 22 to hold the roll-like copying paper 20, paper cutting device 24, charging device 26, exposure unit 28, magnetic brush developing device 30, and pressure fixation unit 32 which are arranged in this order.

In an optical device 38 to focus the original image on the copying paper in the exposure unit 28, a projector 40 contains exposure lamp 42 and reflecting wall 44 to project light onto the original document through the transparent plate 4, and the light from the projector 40 projected onto the original document and reflected therefrom passes through a reflection mirror 46, movable reflection mirror 48, in-mirror lens 50, and reflection mirrors 52 and 53 to focus the original image onto the exposure zone d. In the copying operation, the projector 40 and reflection mirror 46 are driven by motor 54 rightwards in the direction of arrow 88 in FIG. 2, while the movable reflection mirror 48 also runs simultaneously rightwards at half the speed of the projector 40. The projector 40 and the movable reflection mirror 48 are, as shown in FIG. 2, located at positions indicated by imaginary lines 56 and 58, respectively, when at the right end of the running passage.

Figure 3:
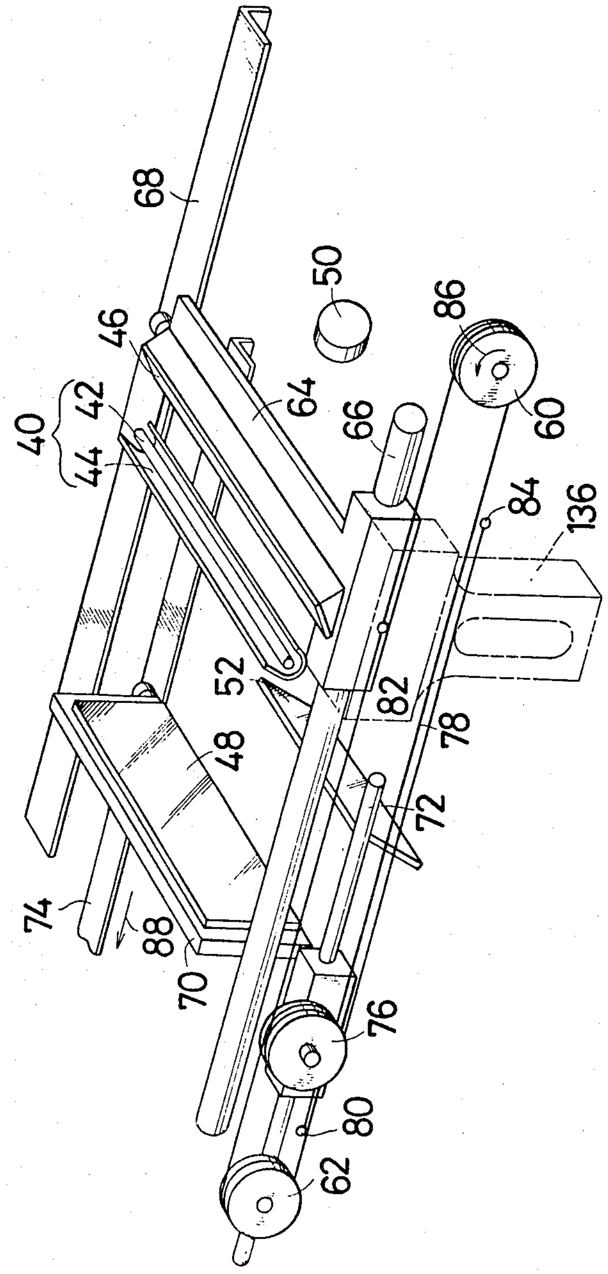
FIG. 3 is a schematic perspective view of the rear side of the copying apparatus showing a projector, a reflection mirror and a moving mechanism of the movable reflection mirror.

FIG. 3 is a schematic drawing as viewed from the rear of the copying apparatus, showing the projector 40, reflection mirror 46, and the moving mechanism of movable reflection mirror 48. At the right and left ends of the machine frame 2 are provided pulleys 60 and 62 which have horizontal axial lines and which are spaced away from each other in the horizontal direction. The projector 40 and reflection mirror 46 are fastened to a support 64, and the support 64 is guided freely in the horizontal direction along a pair of guide rails 66 and 68. Another support 70 to hold the movable reflection mirror 48 is guided freely in the horizontal direction along a pair of guide rails 72 and 74. The support 70 is held by pulley 76 which has a horizontal axial line. One end of a cable 78 is fixed to the support 64 and reeled on pulleys 60, 62 and 76 by about half the periphery of each, and the other end 80 of cable 78 is fastened to the machine frame 2. One end of a second cable 82 is fixed to the support 64 and reeled on pulley 76 by about half the periphery thereof, and the other end 84 of cable 82 is fastened to the machine frame 2. Therefore, when the support 64 moves to the left in the direction of arrow 88 in FIG. 3, the pulley 60 is rotated in the direction of arrow 86, and the movable reflection mirror 48 moves in the same moving direction 88 as the projector 40 and reflection mirror 46, but at half the speed thereof.

Referring again to FIG. 2, in the paper feed device 8 the roll-like copying paper 20 sent from the holder 22 is uncurled by guide roller 90, and is led to the paper cutting device 24 through a pair of paper feed rollers 92 and 92'. The paper cutting device 24 comprises rotary blade 96 and fixed blade 98, and the copying paper is cut by a rotary movement of the rotary blade 96.

In the machine frame 2, at the upstream side of the charging device 26 in the passage 36 are provided a pair of copying paper transfer rollers 100 and 100' which are always driven by the motor 54. The charging device 26 contains filament-like corona discharge electrodes, which apply an electrostatic charge uniformly to the photoconductive layer of copying paper 20. At the downstream side of the exposure zone d in passage 36 are provided a pair of copying paper transfer rollers 104 and 104'. The rollers 104 and 104' are always driven by the motor 54. The movement of the projector 40 in the copying operation is synchronized with the movement of copying paper on the passage 36. The image of the original document is focused on the photoconductive layer of copying paper 20 charged by the charging device 26, and an electrostatic latent image corresponding to the image on the original is formed on the copying paper 20. The magnetic brush developing device 30 installed at the discharge side of the copying paper transfer rollers 104 and 104′ is installed on the passage 36 and possesses cylindrical developer retainer 108 with powder toner magnetically retained on its surface. While the periphery of the developer retainer 108 and the copying paper 20 keeping the electrostatic latent image are moved at the same speed, the image is developed by the powder toner. Above the developer retainer 108 is provided a toner refiller 110 for refilling the developer retainer 108 with powder toner. Below the developer retainer 108 is provided a guide roller 112 which is intended to guide the copying paper. At the discharge side of the magnetic brush developing device 30 is arranged the pressure fixation unit 32. The pressure fixation unit 32 is equipped with a pair of pressure rollers 114 and 114′ to which specified pressure is applied. When the paper developed by the developing device 30 passes through a pair of pressure rollers 114 and 114′, the unfixed toner image on the paper is fixed. At the discharge side of this fixation unit 32 are provided a pair of discharge rollers 118 and 118′, which will discharge the fixed copying paper onto the copy tray 122. When the copying paper 20 remains between discharge rollers 118 and 118′, the actuator 126 of discharge detection switch 124 is actuated by the paper 20 to change the switching mode of discharge detection switch 124.

Figure 4:
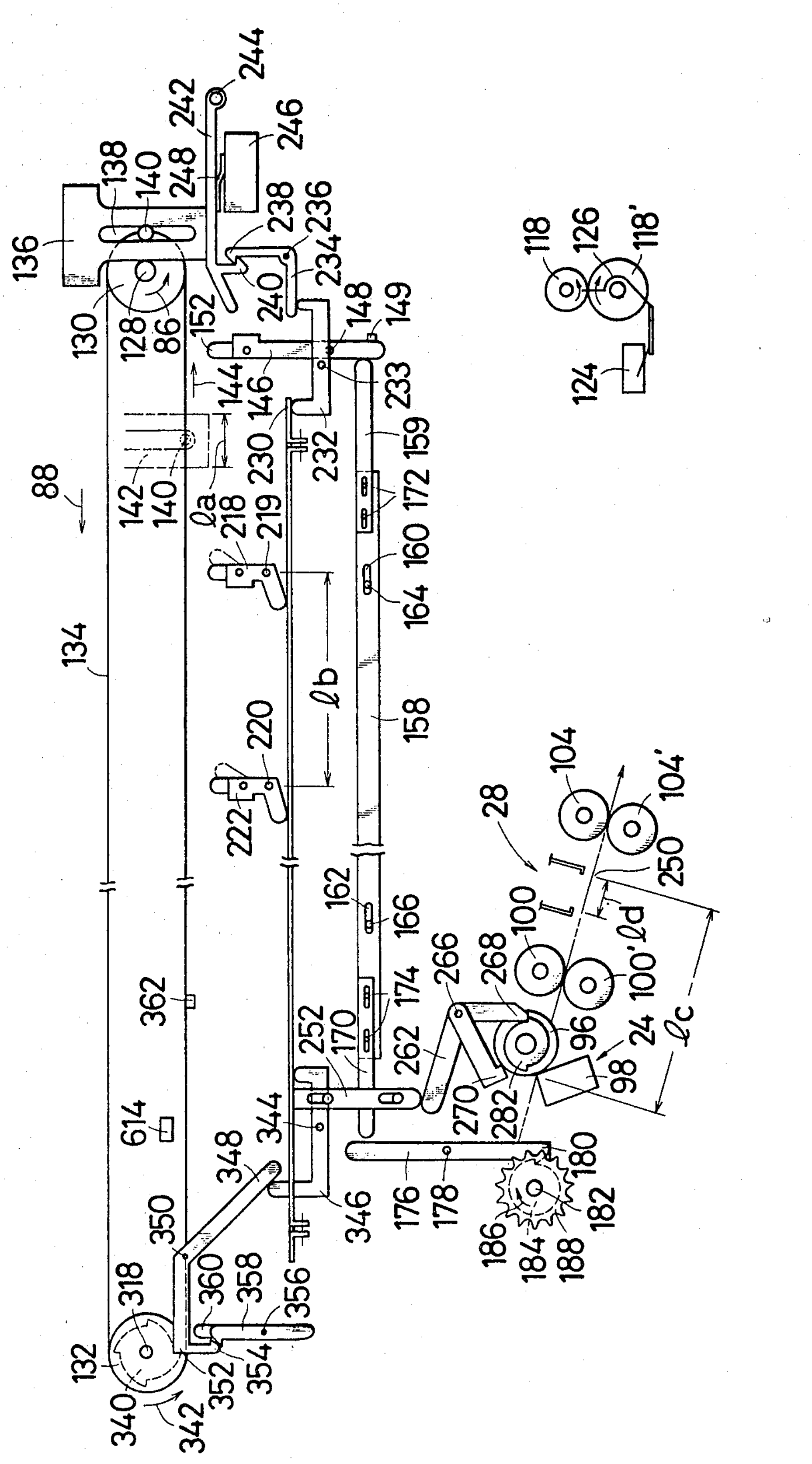
FIG. 4 is a schematic rear view of the copying apparatus.

FIG. 4 is a schematic back view of the copying apparatus. A rotary shaft 128 incorporated in the machine frame 2 has sprocket wheel 130 connected thereto. Another sprocket wheel 132 is fitted to the machine frame 2, horizontally spaced away from the sprocket wheel 130. Between these sprocket wheels 130 and 132 is reeled or wrapped an endless chain 134. A moving member 136 connected to the support 64 has an oval hole 138. Into this oval hole 138 is loosely fitted pusher 140 which is fastened to the chain 134. Accordingly, when the sprocket wheel 130 rotates in the direction of arrow 86, causing the chain 134 to run, the pusher 140 causes the moving member 136 to reciprocate horizontally. During intermission of copying operation, the moving member 136 stays at a rest position shown by the imaginary lines 142.

When the print button 16 (FIG. 1) is pressed, the sprocket wheel 130 is driven in the direction of arrow 86 by a drive mechanism described later. Thereby, the moving member 136 in the rest position 142 will move in the direction of arrow 144. In consequence, the moving member 136 is first detected by a paper feed detecting member 146. This paper feed detecting member 146 is rotatably mounted on a swing shaft 148 secured on the machine frame, in the longitudinal direction, and a torsion spring (not shown) inserted into the swing shaft 148 builds up a resilient or repulsive force, that is spring-biased, in the counterclockwise direction of FIG. 4 around the swing shaft 148. A stopper 149 connected to the machine frame 2 limits the rotational displacement of the swing shaft 148 in the counterclockwise direction.

Figure 5:
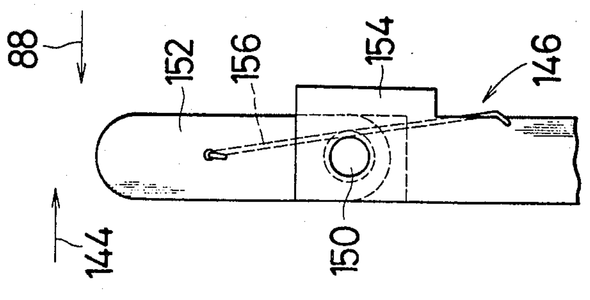
FIG. 5 is a front view showing an upper portion of the paper feed detecting member shown in FIG. 4.

Referring to FIG. 5, the paper feed detecting member 146 comprises contact piece 152 which is free to move about and is supported by pin 150, stopper 154 which prevents the contact piece 152 from rotating around the pin 150 ahead of the moving direction 144 of moving member 136, and torsion spring 156 which is inserted into the pin 150 to thrust the contact piece 152 repulsively towards the stopper 154 around the pin 150. In this construction, therefore, when the moving member 136 moves in the direction 144, it contacts with the contact piece 152, thereby causing the paper feed detecting member 146 to swing around the swing shaft 148 in a clockwise direction as viewed in FIG. 4, against the spring force of the torsion spring fitted to the swing shaft 148. When the pusher 140 turns half way around the sprocket wheel 130 to move the moving member 136 in the moving direction 88, the moving member 136 contacts again with the contact piece 152, but at this time, the contact piece merely revolves counterclockwise as viewed in FIG. 4 and FIG. 5 around the pin 150 against the spring force of the torsion spring 156, so that the paper feed detecting member 146 will not swing around the swing shaft 148.

The end of the paper feed detecting member 146 opposite to the contact piece 152 with respect to the swing shaft 148 comes in contact with one end 159 of link 158. The link 158 has elongated holes 160 and 162 extending in the longitudinal direction. Into these holes 160 and 162 are loosely inserted guide projections 164 and 166, respectively, which are provided in the machine frame 2. Thus, the link 158 is supported by the machine frame 2, and is free to move horizontally.

Figure 6:
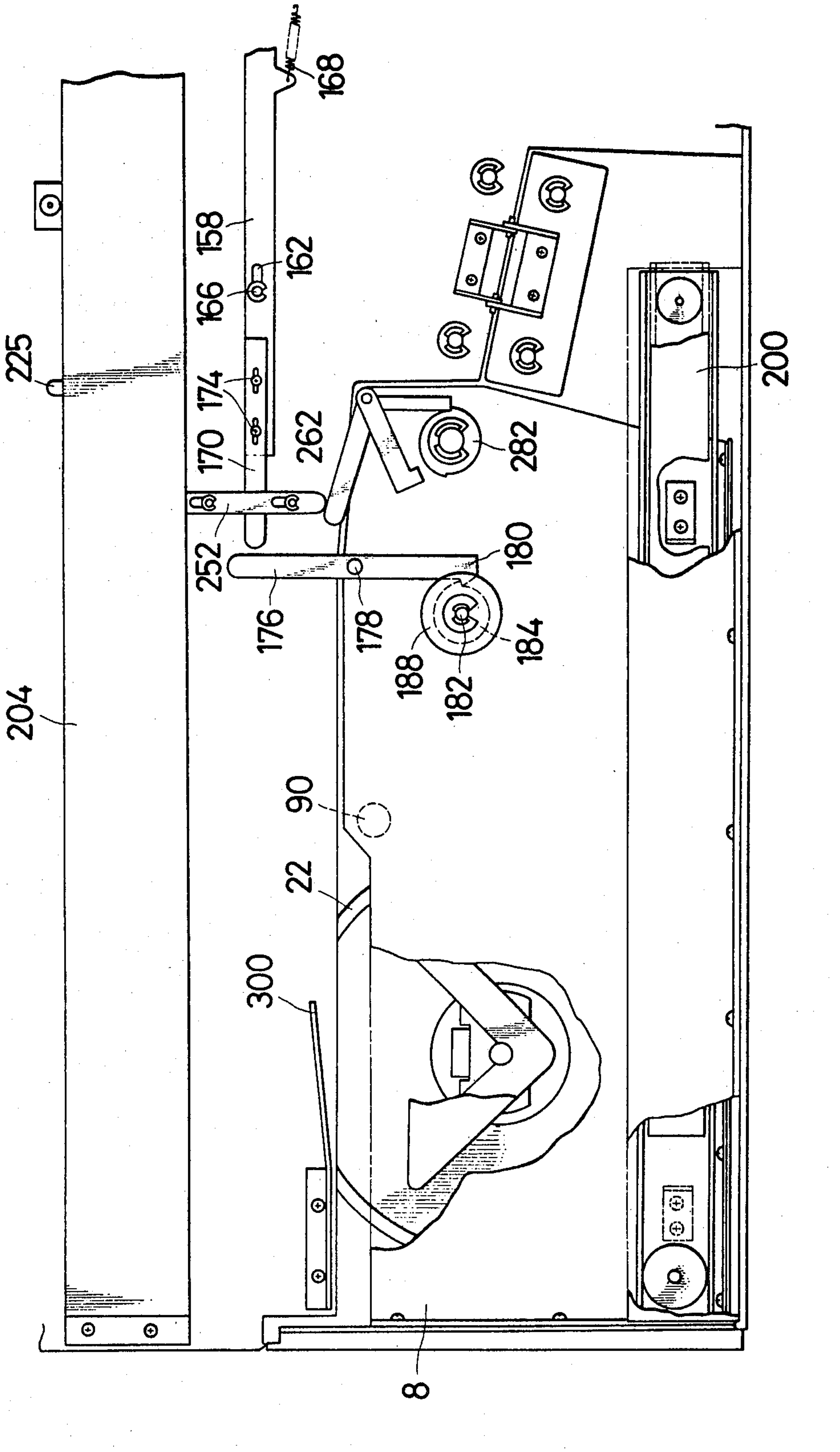
FIG. 6 is an enlarged rear side view of the paper feed device shown from the rear of the copying apparatus.

FIG. 6 is an enlarged view of the paper feed device 8 and its vicinity as viewed from the rear of the copying apparatus. The link 158 is given a repulsive force toward the paper feed detecting member 146 (the right side in FIG. 4 and FIG. 6) by spring 168. This repulsive force keeps one end 159 of the link 158 in contact with the paper feed detecting member 146. In order to permit adjustment of the paper feed start point, the length of the link 158 is made adjustable by the specific structure in which the longitudinal projection length of both ends 159 and 170 of the link 158 can be adjusted by turning set-screws 172 and 174.

A pivotal cog member 176, one end of which is capable of being in contact with the end 170 of the link 158, is fitted to the side wall of paper feed device 8 around a pivot shaft 178, and is free to move. The pivotal cog member 176 is provided with a clockwise repulsive force in FIG. 4 in FIG. 6 by a torsion spring (not shown) inserted into the pivot shaft 178. A cog 180 is fitted to the other end of the pivotal cog member 176. The cog 180 meshes with the teeth of a ratchet wheel 184 which is fitted to a rotary shaft 182 integral with the paper feed roller 92′ (see FIG. 2). The teeth of the ratchet 184 are formed so as to prevent the rotation thereof in the paper feed rotational direction 186 of copying paper 20.

Figure 7:
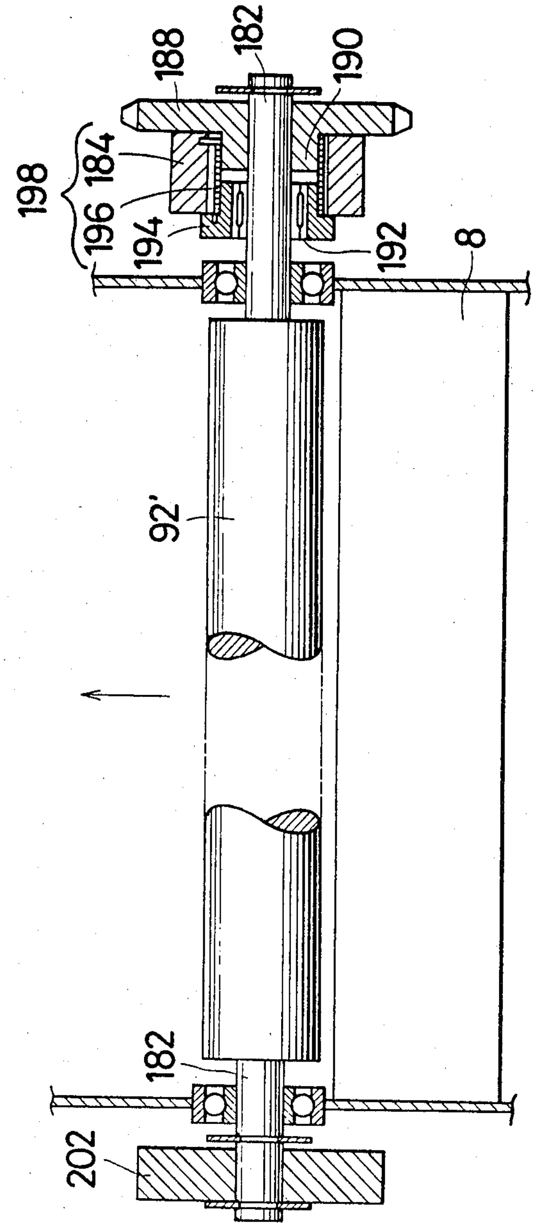
FIG. 7 is a horizontal sectional view of the paper feed device including a paper feed roller.

FIG. 7 is a sectional view of the vicinity of the paper feed roller 92′. A sprocket wheel 188 is fitted to the rotary shaft 182, and a boss 190 of the sprocket wheel 188 extends along the rotary shaft 182. A one-way clutch 192 is mounted on the rotary shaft 182, face to face with the boss 190. The one-way clutch 192 transmits rotational force to the rotary shaft 182 in the direction of arrow 186 (see FIG. 4) from its input end 194, but does not transmit any rotational force in the reverse direction. The one-way clutch 192 has a plurality of rollers arranged in the peripheral direction placed individually in spaces defined by the external circumference of the rotary shaft 182 and an equal plurality of recesses inclined narrowly in the direction of arrow 186 formed in the input end 194. Such clutch may be a conventional one in this art in which torque is transmitted by catching the rollers between the external circumference of rotary shaft 182 and the recesses when the input end 194 rotates in the direction of arrow 186. The sprocket wheel 188 is always driven by the motor 54.

At the input end 194 of one-way clutch 192 is constituted a part which has the same outside diameter as the boss 190 of the sprocket wheel 188. A part of input end 194 and the boss 190 are surrounded by spring 196. The spring 196 is wound in a coil form in a direction to tighten the boss 190 and input end 194 in the paper feed rotational direction 186. One end of spring 196 is linked to the ratchet 184 and the other end to the input end 194. Thus, the ratchet 184 and the spring 196 form a so-called wrap spring clutch 198.

When the moving member 136 is at the rest position 142 and the cog 180 of the pivotal cog member 176 is engaged with the teeth of the ratchet wheel 184, the spring 196 of wrap spring clutch 198 loosens from the boss 190 of the rotating sprocket wheel 188. As a result, the torque of the sprocket wheel 188 is not transmitted to the paper feed roller 92'.

In the copying operation, when the moving member 136 moves in the direction of arrow 144 to cause the paper feed detecting member 146 to swing around the swing shaft 148 clockwise in FIG. 4, the link 158 is dislocated leftward in FIG. 4, and in response thereto the pivotal cog member 176 turns around the pivot shaft 178 counterclockwise in FIG. 4 and FIG. 6. This causes engagement between the cog 180 and the ratchet wheel 184 to be released. Consequently, the spring 196 of wrap spring clutch 198 works to tighten the boss 190 of rotating sprocket wheel 188 and the input end 194 of one-way clutch 192. As a result, the torque of the sprocket wheel 188 is transmitted to the rotary shaft 182 through the wrap spring clutch 198 and one-way clutch 192. Thus, the paper feed roller 92' nips the copying paper 20 with another paper feed roller 92 to feed it along the passage 36 only when the cog 180 and the ratchet wheel 184 are disengaged from each other.

In this embodiment, the length of link 158 is predetermined so that the paper feed roller 92' rotates two turns while the moving member 136 is moving along the direction of arrow 144 to swing the pper feed detecting member 146 in the clockwise direction in FIG. 4, that is, while the moving member 136 is moving (only by length l a (FIG. 4) which corresponds to the length of the member 136 being in contact with the contact piece 152. As the paper feed roller 92' rotates two turns, the forward end of copying paper 20 at the position of paper cutting device 24 is carried at least to the pair of copying paper transfer rollers 100 and 100'. Since these two rollers are always driven by the motor 54, once the copying paper 20 is nipped by roller 100 and 100', thereafter the copying paper 20 is pulled even when the cog 180 and the ratchet wheel 184 are engaged with each outer, thereby permitting the paper feed roller 92' to rotate freely together with the other paper feed roller 92 by virtue of the one-way clutch 192.

By selecting the length of the link 158, it is possible to choose the paper feed start point or the point of disengagement of cog 180 and ratchet wheel 184. For instance, by extending the length of the link 158 by stretching the one end 159 and the other end 170 outward to the axial direction, the paper fee start point can be advanced. Thus, paper feed timing can be achieved correctly and easily, and maintenance can also be facilitated.

Figure 8:
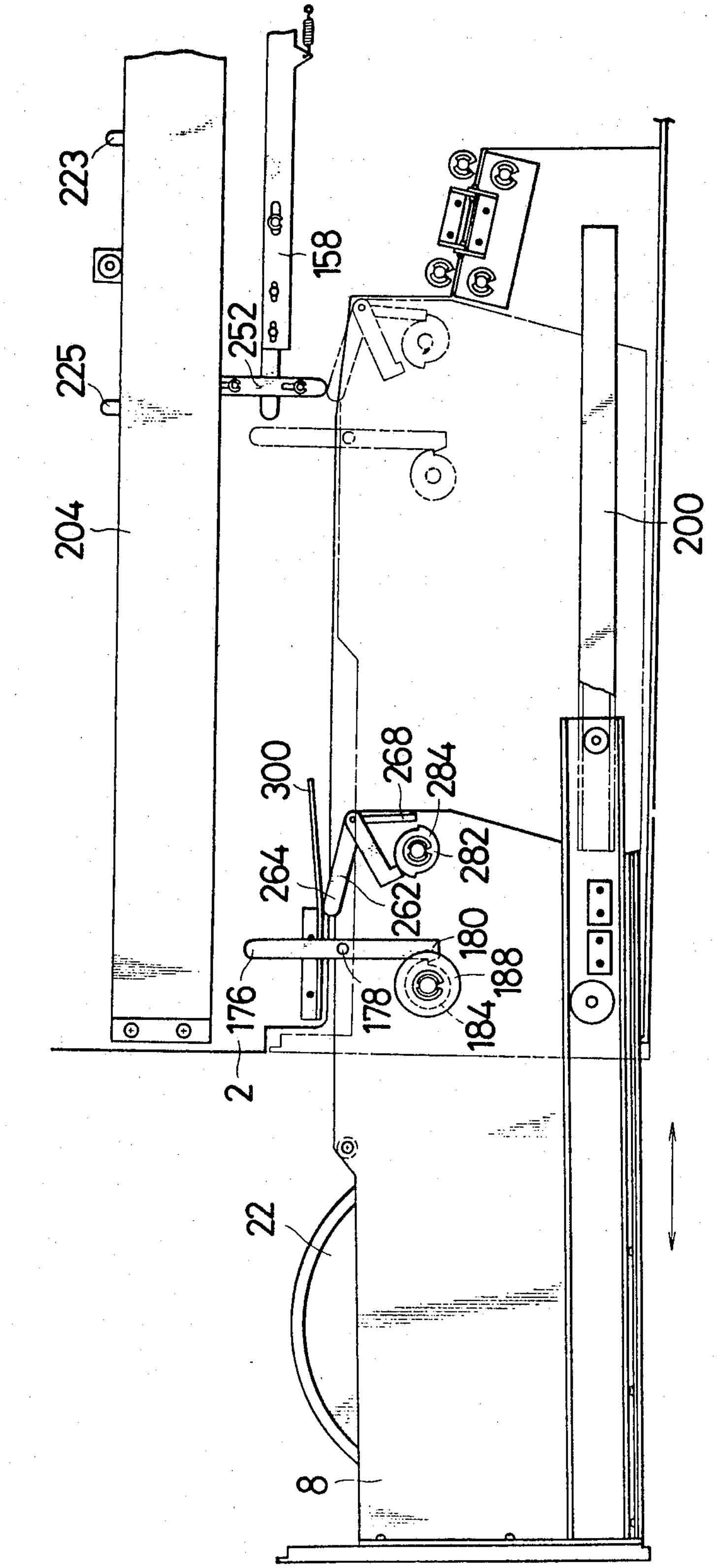
FIG. 8 is an enlarged view of the paper feed device shown from the rear of the copying apparatus.

FIG. 8 shows the paper feed device 8 drawn out of the machine frame 2 by means of telescopic-type guide rails 200. The pivotal cog member 176 is provided with a repulsive force by the torsion spring (not shown) inserted into the pivot shaft 178 so that the cog 180 is kept engaged with the ratchet wheel 184, therefore the paper feed roller 92' does not rotate unexpectedly. In FIG. 8, the new copying paper 20 can be fed into the paper feed device by inserting the paper between the paper feed rollers 92 and 92' by turning a rotary knob 202 (FIG. 7) which is connected to the rotary shaft 182 of paper feed roller 92', thus bringing the paper up to the paper cutting device 24. When the rotary knob 22 is turned in the paper feed rotational direction 186, the paper feed roller 92' is set free by the one-way clutch 192. Thereby, it is possible to transfer the copying paper to the paper cutting device 24 while maintaining the engagement of cog 180 and ratchet wheel 184.

In this embodiment, the length of passage 36 is selected so that the copying paper is completely discharged into the copy tray 122 by means of discharge rollers 118 and 118' when the moving member 136 returns to the rest position upon completion of the copying operation.

Figure 9:
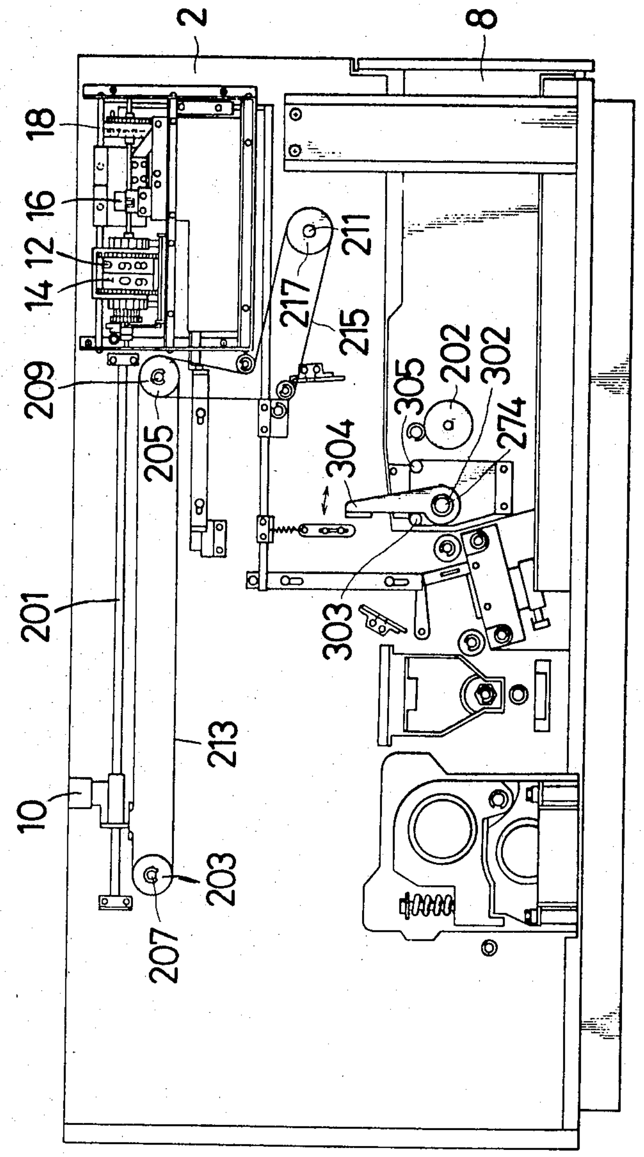
FIG. 9 is a front view of the copying apparatus.

FIG. 9 is the front view of the copying apparatus with the cover 442 (FIG. 1) removed. The knob 10 can be freely moved in the horizontal direction along a guide rod 201. The knob 10 is connected to a cable stretched and wrapped between pulleys 203 and 205.

Figure 10:
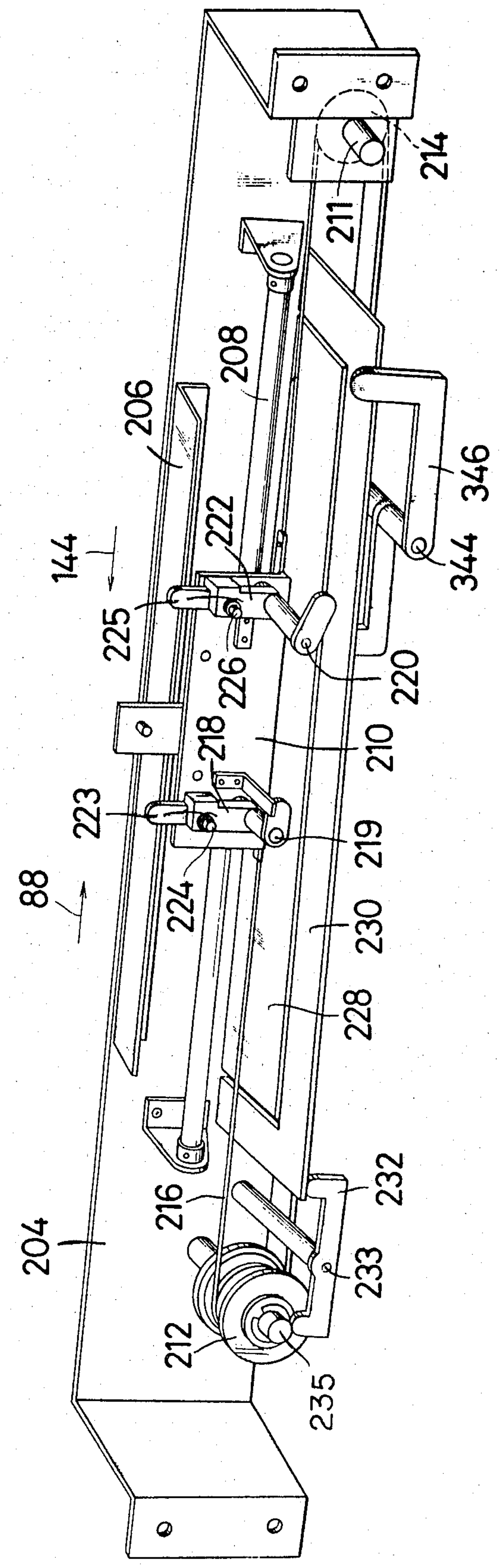
FIG. 10 is a perspective view shown from the front side of the copying apparatus partially omitting components thereof.

FIG. 10 is a broken-open view shown from the front side of the copying apparatus. Referring to FIG. 9, a rotary shaft 211 penetrates through the machine frame 2 in the axial direction. A pulley 217 is fixed to the rotary shaft 211 at the front side of the copying apparatus, and a cable 215 is endlessly reeled between the pulleys 217 and 205. The rotary shaft 211 has another pulley 214 attached to the back of the copying apparatus as shown in FIG. 10. A support wall 204 is connected to the machine frame 2, and guides 206 and 208 are fitted to the support wall 204 in the horizontal moving direction of the moving member 136. A movable support member 210 is mounted along the guides 206 and 208, and is horizontally movable. The movable support member 210 is secured on the both ends of a cable 216 stretched between the pulleys 212 and 214 located at both ends in the moving direction. A rotary shaft 235 of pulley 212 is held by the support wall 204. Accordingly, by moving the knob 10 in FIG. 9 in the horizontal direction, the cable 213 moves to cause the pulley 205 to rotate. In consequence, the cable 215 moves to rotate the pulley 217 and the rotary shaft 211. This causes the pulley 214 to rotate, which is connected to the rotary shaft 211 as shown in FIG. 10, thereby moving the cable 216. As the cable 216 moves, the movable support member 210 can also be moved.

The movable support member 210 has paper cut detecting member 218 mounted by means of rotary shaft 219, and de-energization detecting member 222 mounted by means of rotary shaft 220. The paper cut detecting member 218 is located relatively backward along the exposure moving direction 88 of the moving member 136, whereas the de-energization detecting member 222 is located relatively forward in exposure moving direction 88. The paper cut detecting member 218 and the de-energization detecting member 222 revolve in the clockwise direction in FIG. 10 only when the moving member 136 moves in the exposure moving direction 88. When member 136 is moving in the reverse direction 144, upper parts 223 and 225 thereof merely turn counterclockwise around pins 224 and 226. This structure is similar to that mentioned in relation to FIG. 5. An inclining member 228 is fitted to the support wall 204 by means of a pivot extending parallel to the direction of wire 216. Outside the inclining member 228 is similarly installed a second inclining member 230. In response to the clockwise revolution of paper cut detecting member 218 and de-energization detecting member 222, the inclining members 228 and 230 pivot downwardly around an axial line extending in exposure moving direction 88. One end of swing lever 232 fitted to the support wall 204 by means of pin 233 is in contact with the inclining member 230, and the other end of this swing lever 232 is in contact with one end of a swing cog member 234 as shown in FIG. 4.

The swing cog member 234 is mounted on the machine frame 2 by means of a pivot shaft 236, and a cog is formed at the other end of the member 234. An actuating layer 242 which possesses cog 240 engaged with cog 238 is mounted on the machine frame 2 by means of a pivot shaft 244. The swing cog member 234 is given a counterclockwise biasing force, as observed in FIG. 4, by a torsion spring (not shown) inserted into the swing shaft 236. The actuating lever 242 is intended to depress an actuator 248 of switch 246. This operating lever 242 is given a clockwise biasing force by the actuator 248.

While the moving member stays at the rest position 142, the cogs 238 and 240 are not engaged with each other. During a copying operation, the moving member 136 shifts in the moving direction 144 from the rest position 142 to push down the operating lever 242. Thus, the cog 240 is engaged with the cog 238 as illustrated in FIG. 4, and this engagement is maintained. When the operating lever 242 is pushed down by the moving member 136, the actuator 248 of switch 246 is also pressed down so that the switch 246 is turned on.

Figure 12:
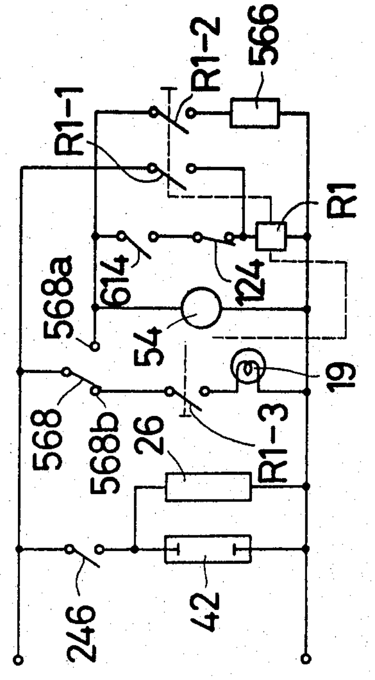
FIG. 12 is an electric circuit diagram of the electrostatic copying apparatus.

FIG. 12 represents the electrical circuitry of this electrostatic copying apparatus. The switch 246 is connected in series to the exposure lamp 42 and the charging device 26 which is connected in parallel with the lamp 42. As the switch is turned on, the exposure lamp 42 lights up and the charging device 26 is ready to charge the copying paper 20.

Figure 11:
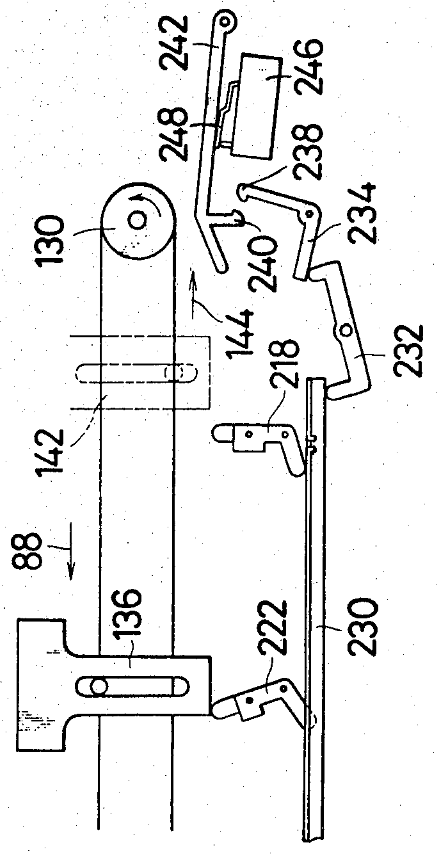
FIG. 11 is a schematic rear side view of the copying apparatus.

When the moving member 136 moves from the position of sprocket wheel 130 in the exposure moving direction 88, the paper cut detecting member 218 is revolved in the counterclockwise direction in FIG. 4 and FIG. 11 to cut the copying paper by the paper cutting device 24. Also, the moving member 136 rotates the de-energization detecting member 222.

Referring to FIG. 11, the moving member 136 is revolving the de-energization detecting member 222 in the counterclockwise direction. The de-energization detecting member 222 pushes down the inclining member 230, which causes the swing lever 232 to disengage the cog 238 of swing cog member 234 from the cog 240 of the actuating lever 242. As a result, the exposure lamp 42 and the charging device 26 are de-energized.

Distance lb (FIG. 4) between the paper cut detecting member 218 and the de-energization detecting member 222 in the exposure moving direction 88 is selected so as to be equal to or slightly longer than distance lc between the cutting position of paper cutting apparatus 24 and the leading end 250 of copying paper transfer passage in the exposure zone ld of the exposure unit 28. Therefore, the exposure lamp 42 can be de-energized when or after the cut copying paper 20 has passed the front end 250 of the exposure zone ld.

Figure 13:
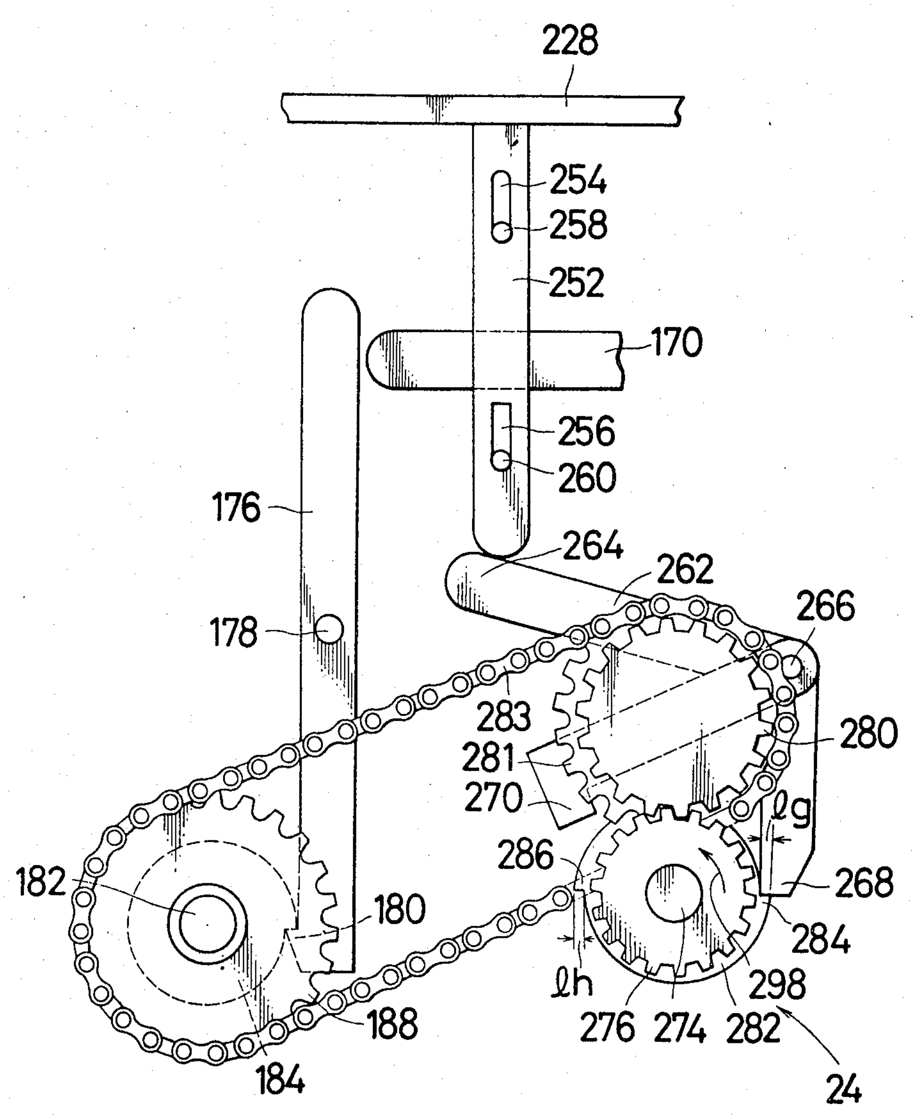
FIG. 13 is an enlarged view of the paper cutting device shown from the rear of the copying apparatus.

FIG. 13 represents an enlarged view of the paper cutting device 24 as viewed from the rear of the copying apparatus. A link 252, the upper end of which is in contact with the inclining member 228, possesses oval holes 254 and 256. Pins 258 and 260 connected to the machine frame 2 are inserted into these oval holes. These pins permit free vertical movement of the link 252. The link 252 touches a contact piece 264 of double cog member 262. The double cog member 262 is linked to the machine frame 2 by means of shaft 266. The double cog member 262 has control cog 268 and rotation lock cog 270 which are located at different circumferential positions around the shaft 266.

Figure 14:
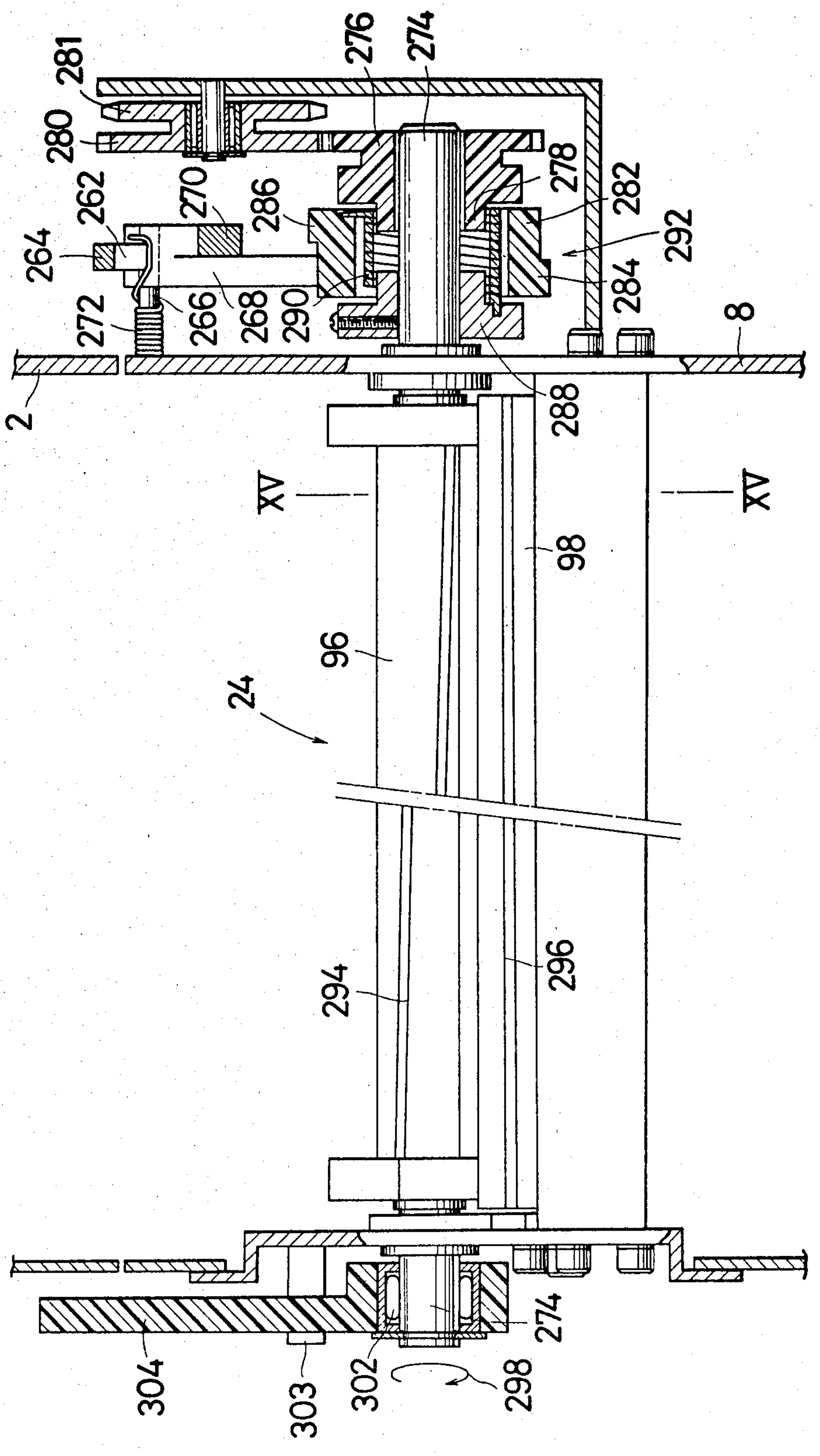
FIG. 14 is a longitudinal sectional view of the paper cutting device.

FIG. 14 is the longitudinal section of the paper cutting device 24. The double cog member 262 is given a repulsive force in the clockwise direction as viewed in FIG. 13 by a torsion spring 272 inserted on the shaft 266. A gear 276 is rotatably mounted on a rotary shaft 274 unified with the rotary blade 96. The gear 276 has boss 278 which extends along the rotary shaft 274. The gear 276 is engaged with another gear 280. A sprocket wheel 281, unified with the gear 280, and the second sprocket wheel 188, interlocked with the ratchet wheel 184, are connected to each other by means of chain 283. The gear 280 is engaged with the gear (not shown) which is mounted on the machine frame 2 and is always driven by the motor 54. When the paper feed device 8 is drawn out of the machine frame 2, it is disengaged from the gear on the machine frame 2 side which is engaged with the gear 280. A double ratchet wheel 282 is loosely fitted to the rotary shaft 274. This double ratchet wheel 282 has a control tooth 284 and a rotation lock tooth 286 which prevent the rotation of the rotary blade 96, at different positions in the axial and circumferential direction. In this embodiment, teeth 284 and 286 are formed on a diameter of the double ratchet wheel 282. A boss member 288 is fitted to the rotary shaft 274, and it is joined face to face with boss 278 of gear 276 in the axial direction. A spring 290 is provided in such a position as to surround the boss 278 and boss member 288. This spring 290 is so wound as to tighten the boss 278 and boss member 288 in the rotational direction 298 of the rotary blade 96, and one end of spring 290 is linked to the boss member 288 and the other end to the double ratchet wheel 282. Thus, the double ratchet wheel 282 and the spring 290 compose a so-called wrap spring clutch 292.

Figure 15:
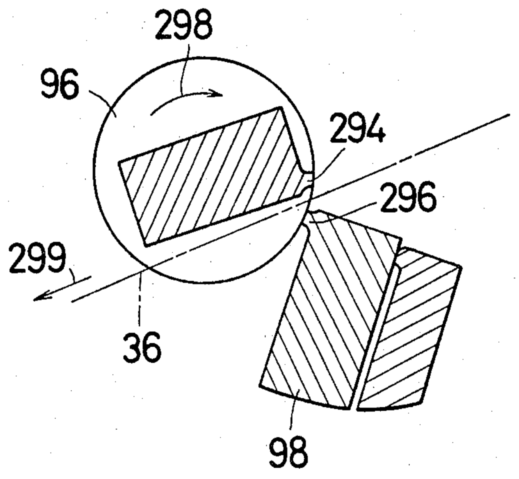
FIG. 15 is an end view taken along the line XV–XV in FIG. 14.

FIG. 15 is the end view along line XV-XV in FIG. 14. The rotary blade 96 has a cutter 294 spirally twisted, for example at twenty-eight degrees, around its rotary axial line. The fixed blade 98 has a linear cutter 296 situated parallel to the rotary axial line of the rotary blade 96. In the state of FIG. 15, a gap to constitute a paper passage 36 is provided between the cutters 294 and 296, so that a copying paper is allowed to run through this gap, and is cut when the rotary blade 96 rotates in the direction 298. At this time of paper cutting, while the copying paper is being transferred along the paper passage 36 in the direction of arrow 299, it is cut continuously from one end to the other in the widthwise direction of the paper. Therefore, it takes some time until the copying paper is cut over the entire width, and the paper continues to be fed even during cutting. By using rotary blade 96, the front of a succeeding paper never touches the cutter 294 to arrest the paper transfer. Hence, the present invention exhibits such advantage that paper jamming due to folding by cutter 294 or other similar cause never take place.

Returning to FIGS. 4, 13 and 14, while the moving member 136 is not touching the paper cut detecting member 218, the control cog 268 of double cog member 262 is engaged with the control tooth 284 of double ratchet wheel 282, thereby preventing the rotation of double ratchet wheel 282. The gears 280 and 276 are rotated, and the rotational direction of gear 276 is indicated by arrow 298. The wrap spring clutch 292 loosens the boss 278 of gear 276 and the boss member 288, so that the rotational power from the gear 276 is not transmitted to the rotary shaft 274.

When the moving member 136 moves in the exposure moving direction 88 to rotate the paper cut detecting member 218 around the pivot shaft 219 in the counterclockwise direction in FIG. 4, the inclining member 228 pushes down the link 252. In consequence, the double cog member 262 resists the repulsive force of the torsion spring fitted on the shaft 266 and revolves in the counterclockwise direction in FIGS. 4 and 13. As a result, the control tooth 284 of double ratchet wheel 282 is disengaged from the control cog 268 of double cog member 262. Therefore, the double ratchet wheel 282 is permitted to rotate in the direction of arrow 298. In response thereto, the spring 290 of wrap spring clutch 292 tightens the boss 278 and boss member 288, so that the rotation of gear 276 is transmitted to the rotary shaft 274 and rotary blade 96 through the wrap spring clutch 292. The time t1 required for the double ratchet 282 and the rotary blade 96 to rotate nearly but less than 360 degrees in the direction 298 is relatively short because the rotary blade 96 turns at a high speed, and t1 is shorter than the time t2 required for the moving member 136 to move in the direction of arrow 88 by distance la thus keeping the paper cut detecting member 218 revolved in the counterclockwise direction in FIG. 4 (that is, $t1 \leqq t2$). Accordingly, the rotation lock tooth 286 is engaged with the rotation lock cog 270 after rotating a little less than 360 degrees, so that the double ratchet wheel 282 is prevented from rotating any more. Hence, owing to the actuation of wrap spring clutch 292, further rotation of the rotary blade 96 can be prevented. After the disengagement of the control tooth 284 from the control cog 268, in order that the double ratchet wheel 282 rotates to cause the rotation lock tooth 286 and rotation lock cog 270 to be securely engaged with each other, the addendum sizes lg and lh of teeth 284 and 286 are determined as to be $lg \leqq lh$.

While the rotation lock tooth 286 is engaged width the rotation lock cog 270, if the moving member 136 further moves in the direction of arrow 88 to come off the paper cut detecting member 218, the double cog member 262 is restored to its original position by revolving around the shaft 266 in the clockwise direction in FIG. 13 due to the repulsive force of the torsion spring 272. As a result, the rotation lock tooth 286 is disengaged from the rotation lock cog 270, so that the double ratchet wheel 282 revolves in the direction of arrow 298, thereby causing the control tooth 284 and the control cog 268 to be engaged with each other instead. Thus, the original state is restored.

Because the rotary blade 96 does not rotate over 360 degrees, the copying paper never produces waste clips, so that paper jamming due to paper waste can be prevented.

Referring now to FIGS. 9 and 14, a manual cutting lever 304 is attached to the other end of rotary shaft 274 of the rotary blade 96 through one-way clutch 302. The one-way clutch 302 operates to transmit the torque of the manual cutting lever 304 to the rotary shaft 274 only when the lever is rotated in direction 298. The swing angle of the manual cutting lever 304 is limited by stoppers 303 and 305 assembled in the machine frame 2. A one-way clutch 302 of conventional type may be employed, one such example consisting of multiple rollers arranged in the circumferential direction, and an input end member where many narrowly inclined recesses are formed in the rotational direction 298 with each roller placed in the space facing the outer circumference of the rotary shaft 274, in which torque is transmitted from the input end to the rotary shaft 274 by holding the rollers between the outer circumference of rotary shaft 274 and the recesses when the manual cutting lever 304 is revolved in the rotational direction 298.

Referring to FIG. 6, a press-down piece 300 having a surface sloping upwards to the side of double cog member 262 is attached to the machine frame 2. The press-down piece 300 pushes down the contact piece 264 of double cog member 262 when the paper feed device is drawn out the machine frame as illustrated in FIG. 8, so as to disengage the control tooth 284 from the control cog 268. Therefore, when newly supplying the holder 22 having copying paper 20 by drawing out the paper feed device 8 from the machine frame 2 as shown in FIG. 8, the copying paper is nipped between the paper feed rollers 92 and 92', and the knob 202 is turned to advance the paper up to the space between the cutters 294 and 296. In this state, by swinging the manual cutting lever 304 to rotate the rotary blade 96 from pin 303 to pin 305 in the rotational direction 298 to cut the copying paper, the apparatus will be ready to start a copying operation at any time. By installing the one-way clutch 302 between the manual cutting lever 304 and the rotary blade 96, the rotary blade 96 can be turned only by oscillating the manual cutting lever 304, but the torque from the rotary blade 96 is not transmitted to the manual cutting lever. Thus, the rotary blade 96 can be rotated with a relatively small oscillation angle displacement of manual cutting lever 304, and since the torque of the rotary blade 96 is not led to the manual cutting lever 304, inertial force during a copying operation of the rotary blade 96 can be kept small, thus assuring that the rotary blade 96 will stop due to the engagement of rotation lock tooth 286 and rotation lock cog 270, and also reducing the stopping impact.

Figure 16:
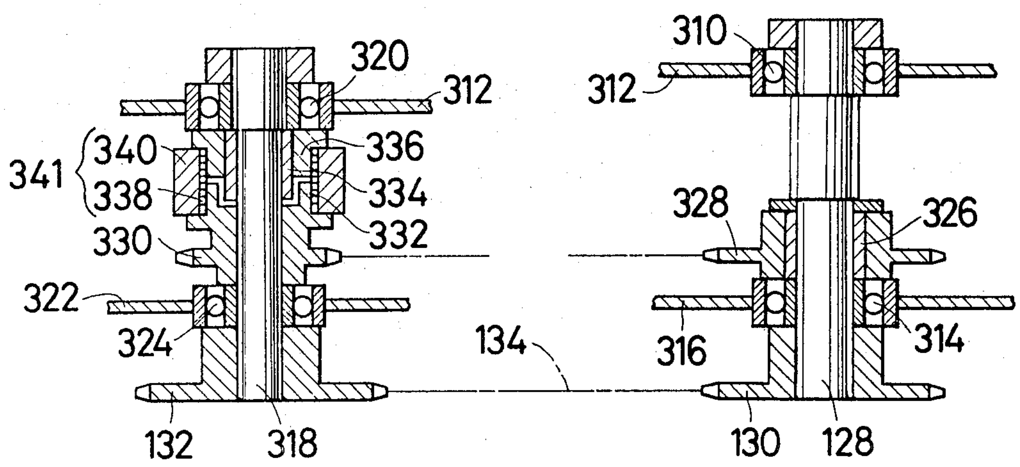
FIG. 16 is a schematic horizontal sectional view of the drive unit of this invention.

FIG. 16 is the schematic horizontal sectional view of the drive unit in connection with the optical device including the projector 40. The rotary shaft 128 which is unified with the sprocket wheel 130 is supported by the side wall 312 of the copying apparatus through bearing 310. The rotary shaft 128 is held by a set plate 316 which is fixed to the side wall 312, through bearing 314. A rotary shaft 318 which is unified with another sprocket wheel 132 is supported by the side wall through bearing 320. The rotary shaft 318 is, in turn, held by a set plate 322 which is fixed to the side wall, through bearing 324. A first drive sprocket wheel 328 is mounted on the rotary shaft 128 through a first one-way clutch 326. This sprocket wheel is driven by the chain stretched between it and the motor 54. The first one-way clutch 326 transmits the torque of the first drive sprocket wheel 328 to the rotary shaft 128 when it rotates in the direction 86 shown in FIG. 4. When the rotary shaft 128 is driven at a higher speed than the first drive sprocket wheel 328 in the direction 86, the first one-way clutch 326 does not transmit power from the rotary shaft 128 to the first drive sprocket wheel 328. While the first drive sprocket wheel 328 is turning the rotary shaft 128 via the first drive clutch 326, the running speed of chain 134 is at the same exposure speed as the copying paper transfer speed.

A second drive sprocket wheel 330 is rotatably mounted on the rotary shaft 318. This second drive sprocket wheel 330 possesses a boss 332 which extends along the rotary shaft 318. A second one-way clutch 334 identical with first one-way clutch 326 in structure is assembled on the rotary shaft 318. Input end 336 of the second one-way clutch 334 is situated face to face with the boss 332, and extends in the axial line of the rotary shaft 318. The outside diameter of input end 336 is equal to that of boss 332.

A spring 338 is provided, which surrounds the input end 336 and the boss 332. One end of this spring 338 is linked to the input end 336, and the other end is linked to ratchet wheel 340 which loosely surrounds the spring 338. The winding direction of the spring 338 is in the direction to tighten the boss 332 and the input end 336 when the second drive sprocket wheel 330 rotates in the direction of arrow 342 (FIG. 4). The ratchet wheel 340 possesses teeth to arrest its rotation in the direction 342. The spring 338 and the ratchet wheel 340 constitute a wrap spring clutch 341. The second drive sprocket wheel 330 is driven by the motor through a chain at a relatively high returning speed so as to let the chain 134 run faster than said exposure speed.

Figure 17:
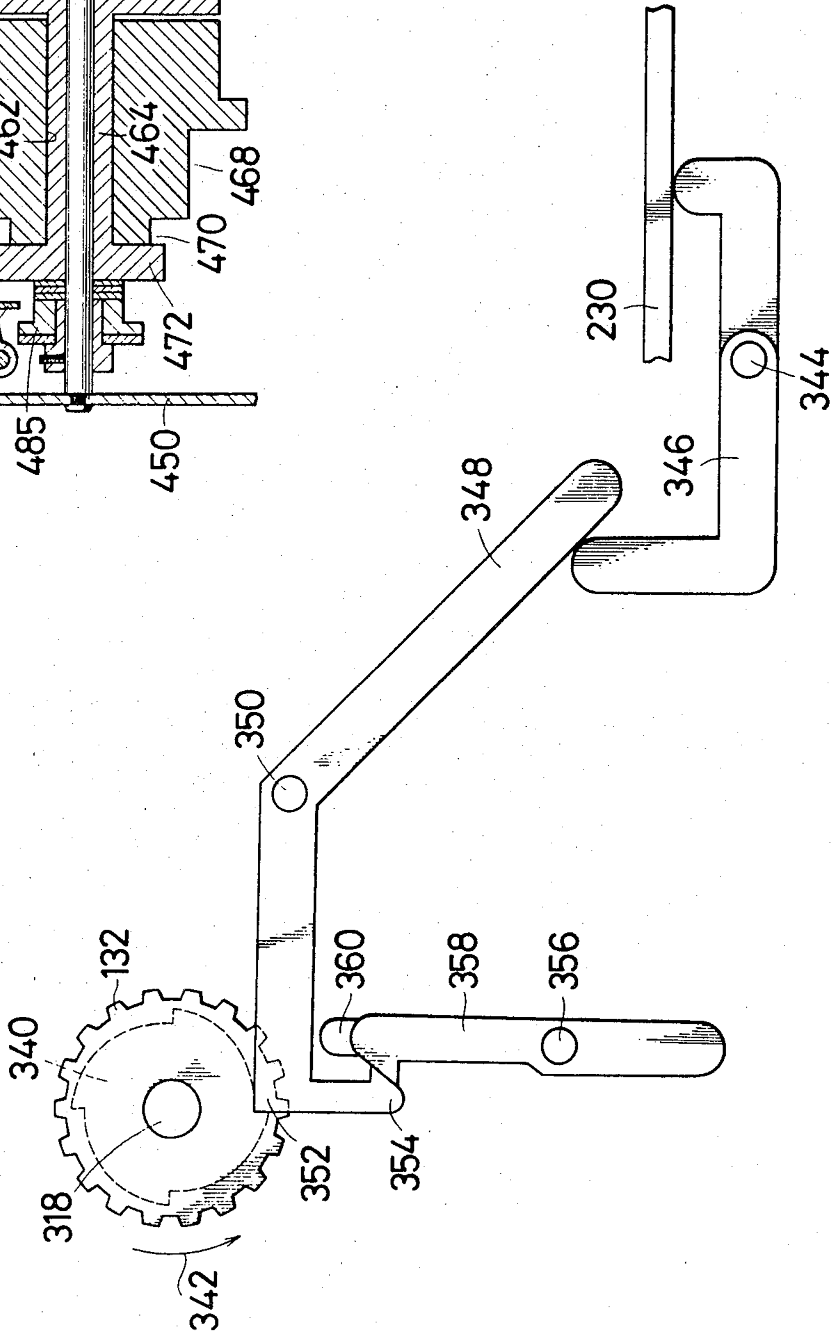
FIG. 17 is an enlarged view of the vicinity of the drive unit of FIG. 10.

In FIG. 10, and in FIG. 17 which is an enlarged view of a portion thereof, an oscillating lever 346 is fitted to the support wall 204 by means of revolving shaft 344. The swing lever 346 is given a repulsive force in the counterclockwise direction in FIG. 17 by a torsion spring (not shown) inserted on the revolving shaft 344, so that one end of lever 346 may contact with the inclining member 230. The other end of the swing lever 346 is in contact with one end of a cog member 348. This cog member 348 is held to the back of the machine frame 2 by means of pin 350. A cog 352 of cog member 348 may be engaged with the teeth of ratchet 340. The cog member 348 includes another cog 354. The cog 354 may be engaged with a cog 358 which is joined to the machine frame 2 by means of pin 356. The cog 358 is given a biasing force around pin 356 in the counterclockwise direction in FIG. 17 by a torsion spring (not shown) in a direction to be engaged with the cog 354. The cog 358 has a projection 360.

When the machine is at rest, that is, being ready for copying, a tooth of ratchet wheel 340 is engaged with the cog 352. When the print button 16 is pressed, the motor 54 is energized, and the first drive sprocket wheel 328 is rotated at a speed suitable for the exposure. At this time, since the ratchet wheel 340 is engaged with the cog 352 to stop the rotation, the power torque from the second drive sprocket wheel 330 is not transmitted to the input end 336 of the second one-way clutch 334, owing to the actuation of the wrap spring clutch 341. Therefore, the torque of the first drive sprocket wheel 328 is transmitted to the rotary shaft 128 through the first one-way clutch 326 to rotate the sprocket wheel 130 in the direction of arrow 86, thus causing the chain to run. The torque from the rotary shaft 318 of the sprocket wheel 132 is not transmitted to its input end 336, that is, the wrap spring clutch 341, owing to the actuation of the second one-way clutch 334. Thus, the moving member 136 connected to the chain 134 runs at the exposure speed to perform exposure.

Upon completion of the exposure, the moving member 136 running in the direction of arrow 88 works to revolve the de-energization detecting member 222 to turn clockwise as shown in FIG. 10, so that the inclining member 230 rotates the oscillating lever 346 around the revolving shaft 344 in the counterclockwise direction in FIG. 10. As a result, the cog 352 of the cog member 348 is released from the ratchet wheel 340. At the same time, the cogs 354 and 358 are energized with each other, and this engagement is maintained. Consequently, the torque of the second drive sprocket wheel 330 is transmitted to the input end 336 through its boss 332 and wrap spring clutch 341. In turn, the torque from the input end 336 is transmitted to the rotary shaft 318 via the second one-way clutch 334. Accordingly, the sprocket wheel 132 rotates at a greater returning speed than the exposure speed. In response thereto, the chain 134 runs, and the sprocket wheel 130 and rotary shaft 128 are rotated at a relatively high returning speed, but such power is not transmitted to the first drive sprocket wheel 328 due to the actuation of the first one-way clutch 326. When the cog 352 of cog member 348 is released from the ratchet wheel 340, the cog 354 remains engaged with the cog 358, so that the separation of the cog 352 from the ratchet wheel 340 will be maintained. This allows the moving member 136 to travel up to the rest position 142 at the returning speed. Just before the moving member 136 reaches the rest position 142, the projection 362 (FIG. 4) on the chain 134 is brought into contact with the projection 360 on the cog 358. Thereby, the cog 358 is rotated in the clockwise direction in FIGS. 4 and 17, and the cogs 354 and 358 are separated from each other, such that instead the cog 352 is engaged with the ratchet wheel 340. This means that when the moving member 136 returns to the rest position 142, the ratchet wheel 340 and the cog 352 of cog member 348 are engaged with each other. Thus, when starting the next copying operation, it is possible to move the moving member 136, projector 40 and reflection mirror 46 exactly at the exposure speed.

Figure 18:
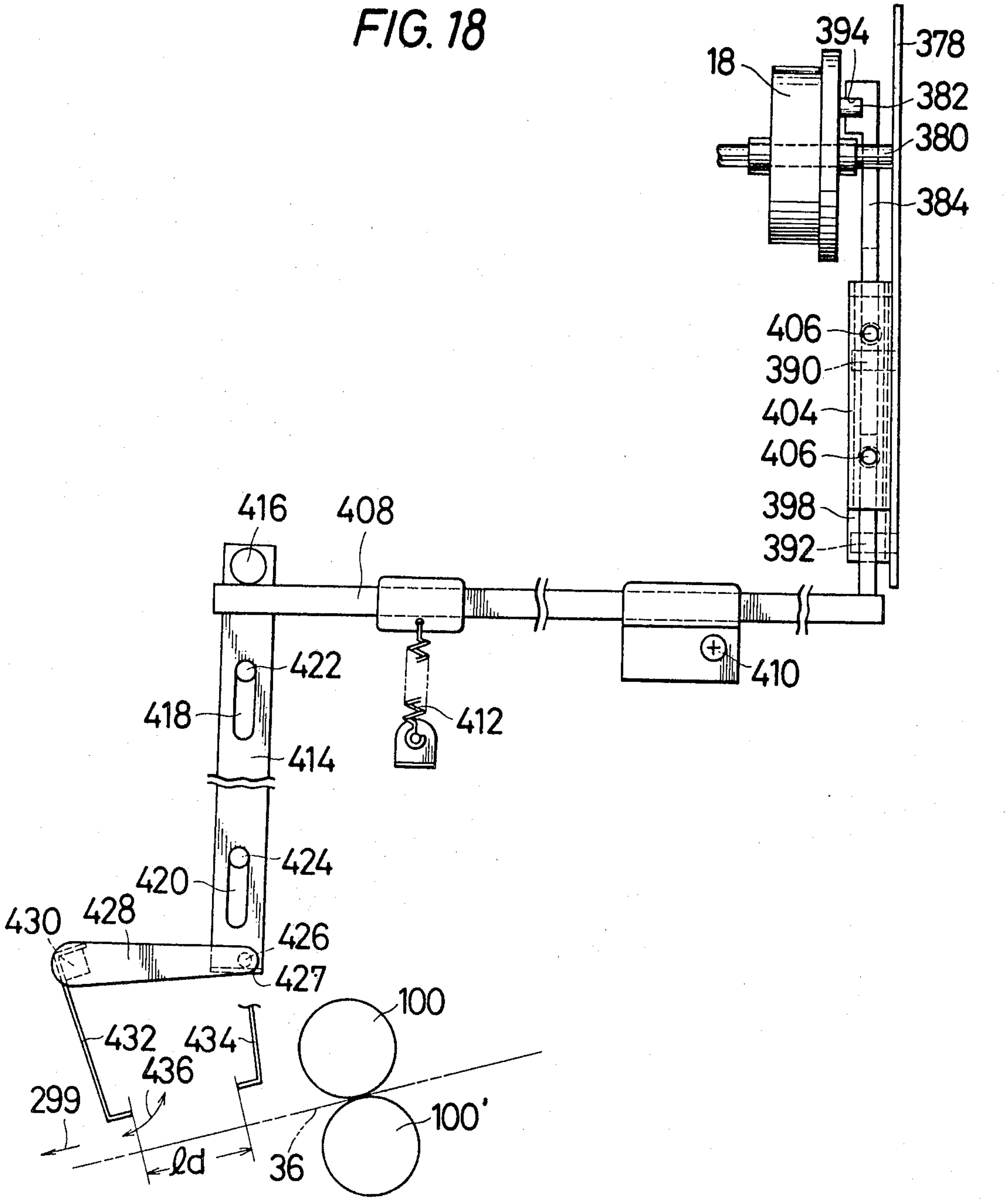
FIG. 18 is a front view of the equipment to adjust the volume of light applied to the copying paper.
Figure 19:
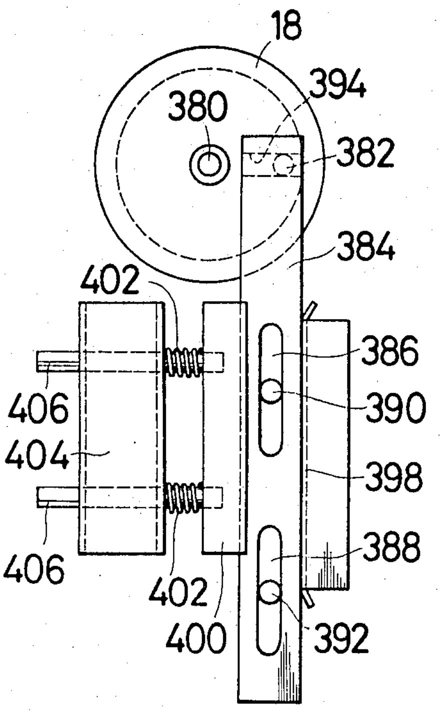
FIG. 19 is a side view showing the vicinity of the knob of FIG. 18.

FIG. 18 is a front view of the equipment to adjust the volume of light applied to the copying paper, and FIG. 19 is the side view thereof. A disc-like light volume adjusting knob 18 is mounted on the side wall 378 of the machine frame 2 by the revolving shaft 380. This knob 18 has an engaging projection 382 at a position spaced from the axial line of revolving shaft 380.

Figure 20:
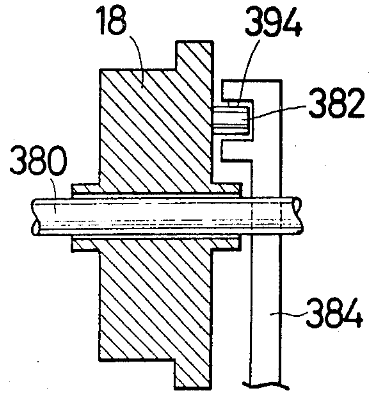
FIG. 20 is a longitudinal sectional view showing the knob in FIG. 18.

FIG. 20 is a longitudinal section of the knob 18 and the vicinity thereof. The position of the knob 18 shown in FIGS. 18 and 20 differs from that shown in FIG. 19. A responsive member 384 is provided at a position spaced from the axial line of the knob 18. Into elongated holes 386 and 388 machined in this responsive member 384 are loosely inserted pins 390 and 392 which are joined to the side wall 378 of the machine frame 2, so that the responsive member 384 can be moved in the vertical direction in FIGS. 18 through 20. The moving direction of the responsive member 384 is perpendicular to the axial line of the knob 18. A recess 394, which loosely receives the engaging projection 382, is formed in the responsive member 384. This recess 394 extends in a direction perpendicular to the direction of vertical displacement of responsive member 384 and axial line of knob 18, that is, in the lateral direction in FIG. 19. Thus, when revolving the engaging projection 382 by turning the knob 18, the responsive member 384 moves only by the amount of displacement of the engaging projection 382 along a straight line in the vertical direction in FIGS. 18 through 20 perpendicular to the revolving axial line of the knob 18. The vertical displacement of the responsive member 384 is limited by the length of elongated holes 386 and 388, so that the range of revolving angle of the knob 18 will be also limited. The other side of the responsive member 384 is in contact with a contact member 398 which is secured on the side wall 378 of the machine frame 2. Surrounding the other side of the responsive member 384 is a U-shaped sliding contact piece 400 urged toward member 384 by means of springs 402. A guide member 404 is fastened to the side wall 378 of the machine frame 2, and has loosely inserted therethrough guide bars 406 at right angles to the displacement direction of the responsive member 384. The guide bars 406 are fastened to the sliding contact piece 400, and the springs 402 are loosely wound around the guide bars 406. In this arrangement, the sliding contact piece 400 is brought into contact with the extreme end of the responsive member 384 along the guide bars 406 due to the action of springs 402. As a result, the responsive member 384 has applied thereto a frictional force, thereby preventing the knob 18 from unexpected movement. A swing lever 408 which has one end in contact with the lower end of the responsive member 384 is supported on the machine frame 2 by means of pin 410. The swing lever 408 is given a biasing force by a spring 412, thus pressing the responsive member 384 upwardly. The other end of the swing lever 408 is in contact with a pin 416 which is fastened to one end of link 414. The link 414 has elongated holes 418 and 420, into which are inserted pins 422 and 424 connected to the machine frame 2, so that the link 414 can be freely moved in the vertical direction in FIG. 18. A lug 427 is provided at the other end of the link 414. On this lug 427 is placed a pin 426 which is fixed to arm 428. The arm 428 is mounted on the machine frame 2 by means of revolving shaft 430. The revolving shaft 430 is perpendicular to the copying paper transfer direction 299, or parallel to the widthwise direction of the copying paper.

A shutter 432 is fitted to the revolving shaft 430. A fixed shutter 434 is fixed to the machine frame 2 behind the transfer direction 299 of paper passage 36 in the exposure zone ld. These shutters 432 and 434 extend over the entire width of the copying paper. The arm 428 and the shutter 432, due to gravity, form a clockwise (FIG. 18) movement around the revolving shaft 430. Thereby, the pin 426 provided on the arm is placed on the lug 427 provided on the link 414.

When the knob 18 is turned manually, the responsive member 384 shifts in the vertical direction, and the swing lever 408 revolves around the pin 410, so that the link 414 moves up or down. In consequence, the arm 428 and the shutter 432 swing around the revolving shaft 430 in the direction of arrow 436, so that the distance ld along the paper passage 36 in the exposure zone ld of copying paper will be adjusted. In the illustration, the mark "ld" represents both the exposure zone and the distance. Therefore, as the copying paper is transferred in the direction of arrow 299 along the passage 36, the light volume of exposure on the copying paper is properly adjusted.

In this example, it is of note that the displacement of the responsive member 384 corresponding to the revolving angle displacement of knob 18 is variable with the revolving angle position of the engaging projection 382. Therefore, (a) the relation between the revolving angle displacement of knob 18 and the exposure light volume can be established in a linear function, or (b) it is also possible to facilitate the operation for the adjustment of light volume by making the fluctuations of light volume relatively small even if the revolving angle displacement of the knob 18 is rather large when obtaining a light volume suitable for copying.

Figure 21:
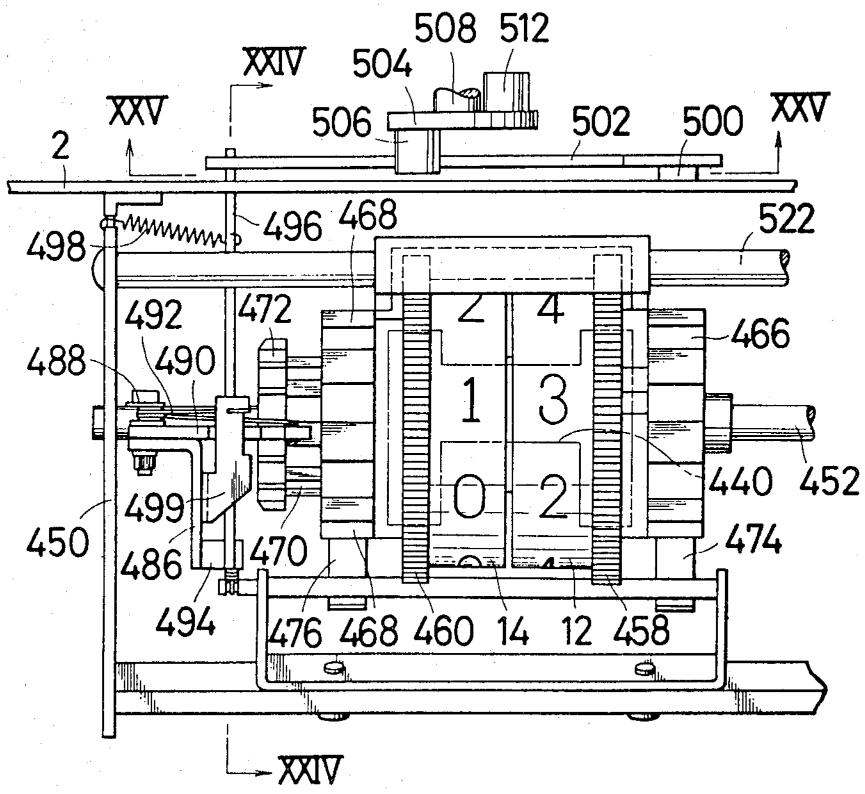
FIG. 21 is a front view of a part of a counter for presetting the number of copies desired.

FIG. 21 is a front view of part of a counter which is used to preset the number of copies desired. A horizontal shaft 452 is joined to a support wall 450 attached to the machine frame 2. Display drums 12 and 14 for setting the number of copies are mounted onto the shaft 452, and can be freely rotated. On the circumference of these display drums 12 and 14 are marked count figures "1," "2," . . . , "9" and "0" in the peripheral direction at equal intervals. The disply drums 12 and 14 are axially arranged one after the other on the shaft 452; the drum 12 represents the first place and the drum 14 represents the second place. At the opposite ends of these display drums 12 and 14 are integrally provided toothed wheels 458 and 460 which are used to dial the display drums. For the convenience of observing the count numbers of display drums 12 and 14 and the toothed wheels 458 and 460, a window 440 (shown in FIG. 23) is provided in the cover 442 (FIG. 1) of the machine frame 2.

Figure 22:
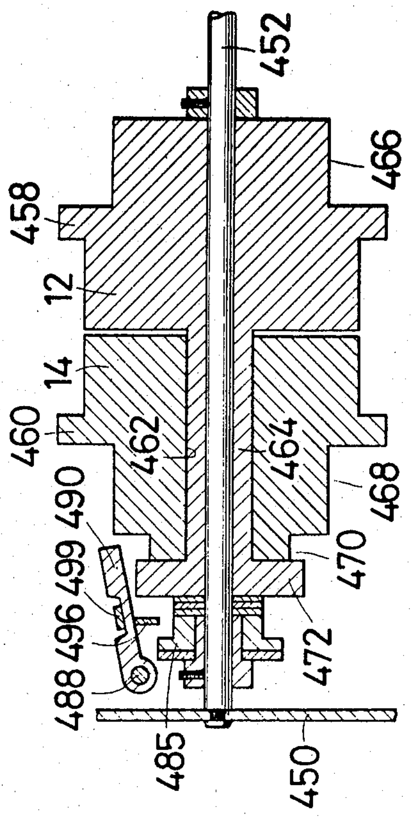
FIG. 22 is a sectional view showing the display drums of FIG. 1.

FIG. 22 is a sectional view of display drums 12 and 14. The display drum 12 is provided with a connecting tube 464 which is set in a through hole 462 formed in the display drum 14. In the circumferential direction of display drums 12 and 14 are provided ten recesses 466 and 468 at equal intervals. A ratchet wheel 470 is formed at the side of the recess 468 of the display drum 14. A ratchet 472 is provided for the connecting tube 464 outside the ratchet wheel 470.

Figure 23:
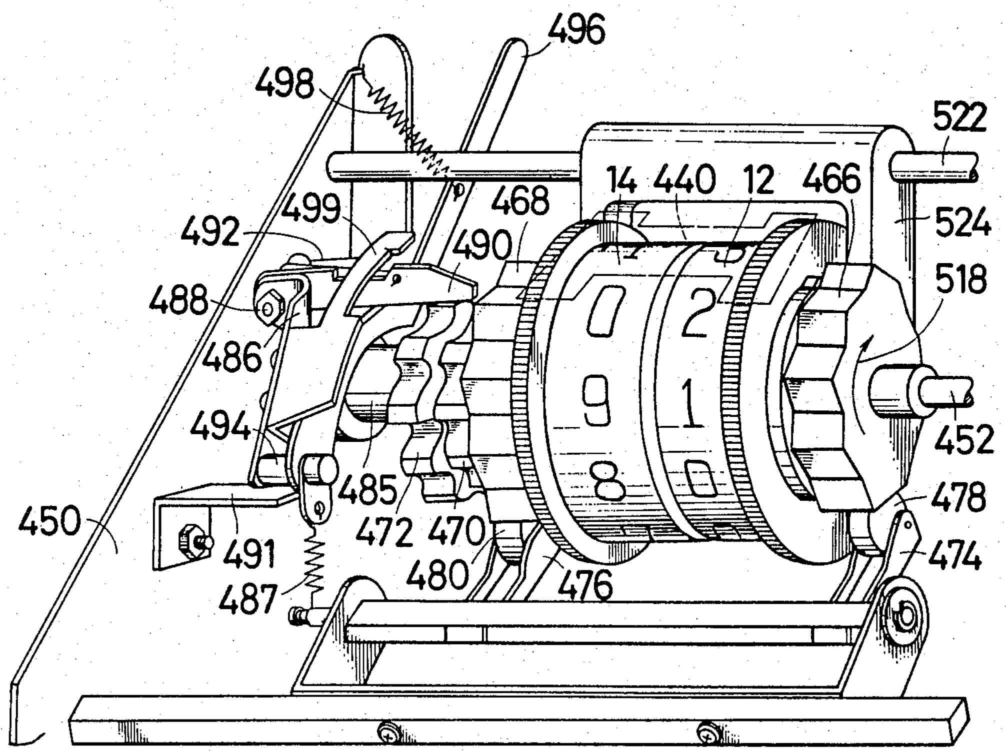
FIG. 23 is a perspective view of the vicinity of display drums.
Figure 24:
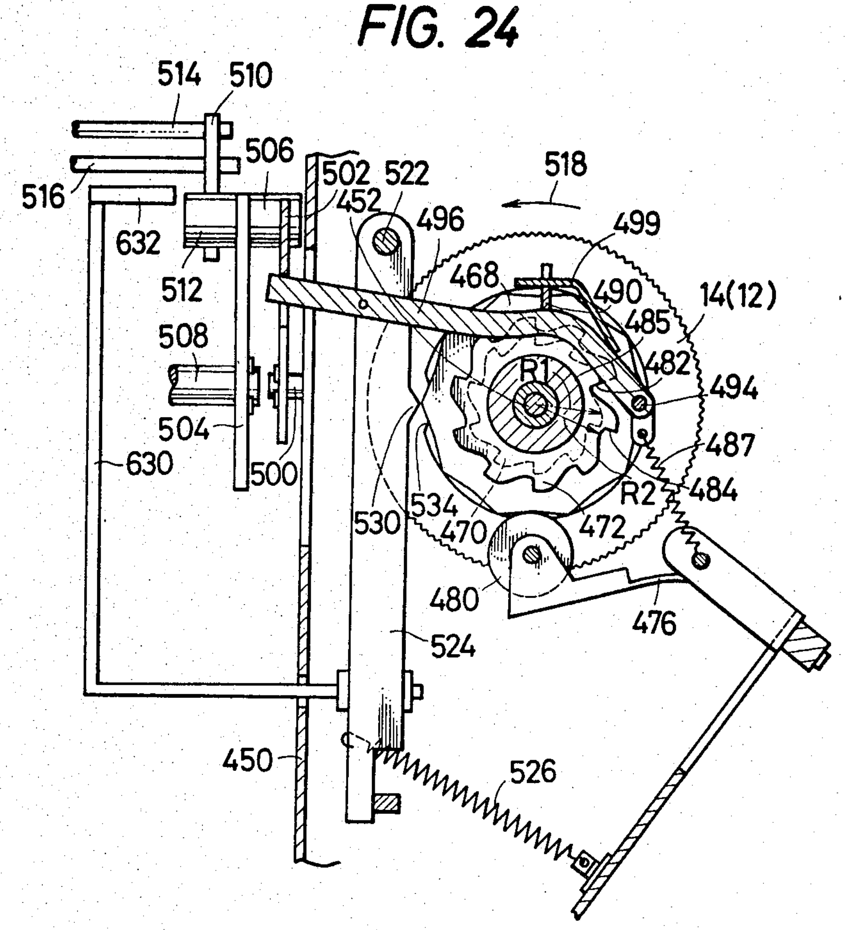
FIG. 24 is a sectional view taken along the line XXIV—XXIV in FIG. 21.

FIG. 23 is a perspective view of the vicinity of the display drums 12 and 14. FIG. 24 is a sectional view along XXIV—XXIV in FIG. 21. Free-to rotate rollers 478 and 480 are in contact with the recesses 466 and 468 by means of leaf springs 474 and 476. In this arrangement, therefore, the display drums 12 and 14 are stopped by the strength of springs 474 and 476 every 36 degrees corresponding to each count figure. The ratchet wheel 472 provided for the display drum 12 for the lower digit possesses a single digit feed tooth 482 whose bottom radius R2 is smaller than the bottom radius R1 of the ratchet wheel 470 provided for the display drum 14 for the second place, and nine remaining teeth 484 whose root radius R2 is larger than the bottom radius of ratchet wheel 470. On the other hand, the ratchet wheel 470 possesses ten teeth identical in configuration. The teeth of these ratchet wheels 470 and 472 are shaped so that their engagement is possible only in the direction 518 so as to decrease the count figure of display drums 12 and 14.

A boss 485 is loosely fitted onto shaft 452. A support piece 486 is attached to this boss 485. The support piece 486 is biased in a direction reverse to the countdown direction of display drums 12 and 14 due to springs 487, and is biased into contact with a stopper 491 connected to the support wall 450. A cog 490 is fitted to the support piece 486 by means of pin 488 which has an axial line extending transverse to the shaft 452. The cog 490 can be commonly engaged with the ratchet wheels 470 and 472. This cog 490 is subjected to a biasing force directed towards the radial direction of the ratchet wheels 470 and 472 so as to be engaged therewith, by means of a torsion spring 492 inserted on the pin 488.

An operating lever 496 is mounted on the support piece 486 by means of pin 494. The actuating lever 496 is given a biasing force in a direction to be separated from the shaft 452, by means of a tension spring 498 stretched between the support wall 450 and the actuating lever 496. The force due to the spring 498 is larger than that due to the torsion spring 492, so that the operating lever 496 pushes up the cog 490 in the radial direction of ratchet wheels 470 and 472, thereby keeping the cog 490 released from the ratchet wheel 472. In this state, the count figure can be set by turning the display drums 12 and 14. A stopper 499 joined to the support piece 486 limits the angle at which the cog 490 is pushed up by the actuating lever 496 by the action of the spring 498.

Figure 25:
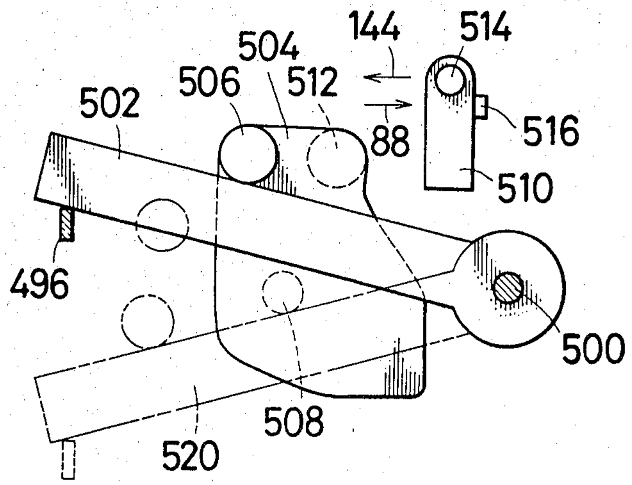
FIG. 25 is a sectional view taken along the line XXV—XXV in FIG. 21.

FIG. 25 is the sectional view along line XXV—XXV in FIG. 21. The free end of the operating lever 496 touches a count detecting member 502 which is pinned to the machine frame 2 by means of pin 500. The count detecting member 502 is in contact with a projection 506 which is integrally provided on an angle extending piece 504. This angle extending piece 504 is joined to the machine frame 2 by means of pin 508. A projection 512 is secured to the angle extending piece 504. The projections 506 and 512 are arranged at different positions in the circumferential direction of the pin 508. A moving piece 510 is pinned by pin 514 to the support 64 (FIG. 3) which moves at the time of copying. The moving piece 510 is prohibited from rotating in the counterclockwise direction in FIG. 25 by a stopper 516 secured on the support 64. While the support 64 is returning to the rest position 142 in the direction of arrow 144 at the end of exposure, the moving piece 510 contacts the projection 512 to revolve the angle extending piece 504 around the pin 508 in the counterclockwise direction in FIG. 25, thereby pushing down the count detecting member 502 as indicated by imaginary line 520. During an exposure operation, on the other hand, the moving piece 510 moves in the reverse direction of the arrow 144, and even when it contacts the projection 512, it merely turns around the pin 514 clockwise in FIG. 25, so that the angle extending piece 504 will not revolve.

Suppose the count detecting member 502 is pushed down as indicated by the imaginary line 520 in FIG. 25. The actuating lever 496 resists the force of the spring 498 to revolve around the pin 494. As a result, the cog 490 is engaged with a tooth 484 of ratchet wheel 472 by the actuation of the torsion spring 492. In this engagement, if the actuating lever 496 is further pushed down by the count detecting member 502, lever 496 is brought into contact with the outside of boss 485 to rotate, together with the boss 485, the cog 490 around the shaft 452 by 36 degrees corresponding to one tooth of the ratchet wheel 472 in the count-down direction 518. When the count detecting member 502 is further revolved after rotating nine teeth 484 of the ratchet wheel 472 by repeating the action above, the cog 490 is engaged with the digit feed tooth 482. At this time, the cog 490 meshes with the teeth of the ratchet wheel 470. Accordingly, both ratchet wheels 470 and 472 are simultaneously rotated only 36 degrees, so that the display drum 14 for the second place is turned in the direction 518 to decrease to count figure thereof by one.

Figure 26:
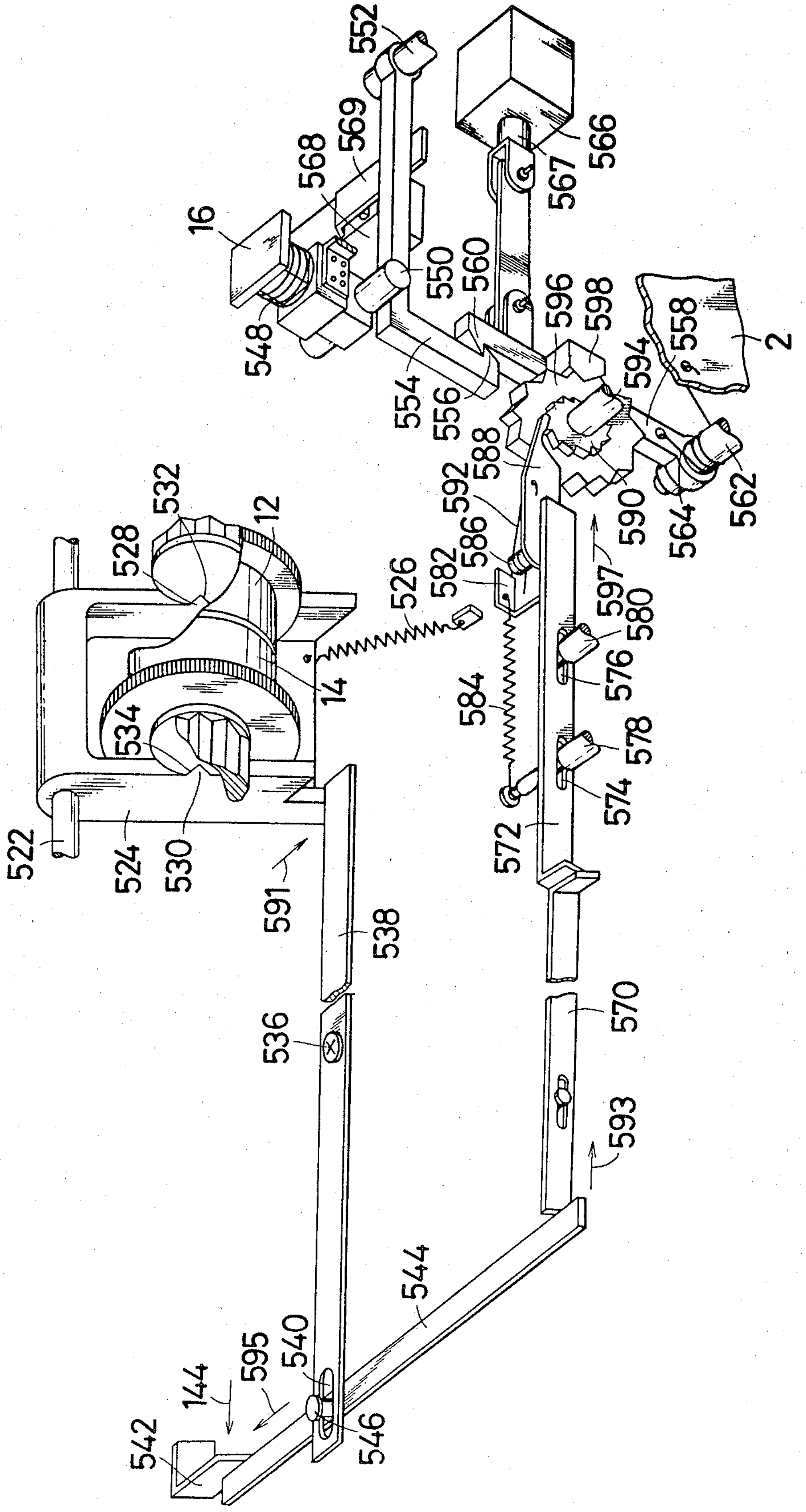
FIG. 26 is a perspective view showing the construction with respect to the counter mechanism of FIGS. 21 through 25.

FIG. 26 is a perspective view showing the counter mechanism detailed in FIGS. 21 through 25. A shaft 522 is mounted on the support wall 450 parallel to the shaft 452, and a count reset detecting member 524 is joined to this shaft 522. This count reset detecting member 524 is fitted to the side of display drums 12 and 14 by means of spring 526. Member 526 also possesses projections 528 and 530. The display drums 12 and 14 have recesses 532 and 534 which are engaged with projections 528 and 530 on the count reset detecting member 524 only when the count number becomes "00". The free end of count reset detecting member 524 is in contact with one end of a swing lever 538 joined to the machine frame 2 by means of pin 536. An oval hole 540 is provided in the other end of swing lever 538.

The support 64 which runs during copying operation has a contact piece 542 attached thereto. Another contact piece 544 is fitted to the machine frame 2 in such a way that it can be approached to and separated from the contact piece 542. A pin 546 is fitted to the contact piece 544, and this pin 546 is loosely inserted into the elongated hole 540. When the contact piece 544 is deflected to the side of contact piece 542, it can be brought into contact therewith.

The print button 16 is biased by spring 548. A pin 550 attached to the print button is brought into contact with an actuating cog member 544 which is rotatably mounted on a shaft 552 of the machine frame 2. An actuating cog 556 of the actuating cog member 554 can be engaged with a retaining cog 560 in a retaining cog member 558. This retaining cog member 558 is connected to the machine frame 2 by means of shaft 562, and is given a biasing force in the counterclockwise direction in FIG. 26 by a torsion spring 564 in a direction to engage the cogs 556 and 560 together. A print switch 568 is changed over when the actuating cog member 554 is pushed down by the print button 16.

The retainer cog member 558 is pinned to a plunger 567 of a magnetic plunger 566. The engagement of cogs 556 and 560 is canceled when the plunger 567 of the magnetic plunger 566 is attracted in the rightward direction in FIG. 26.

Figure 27:
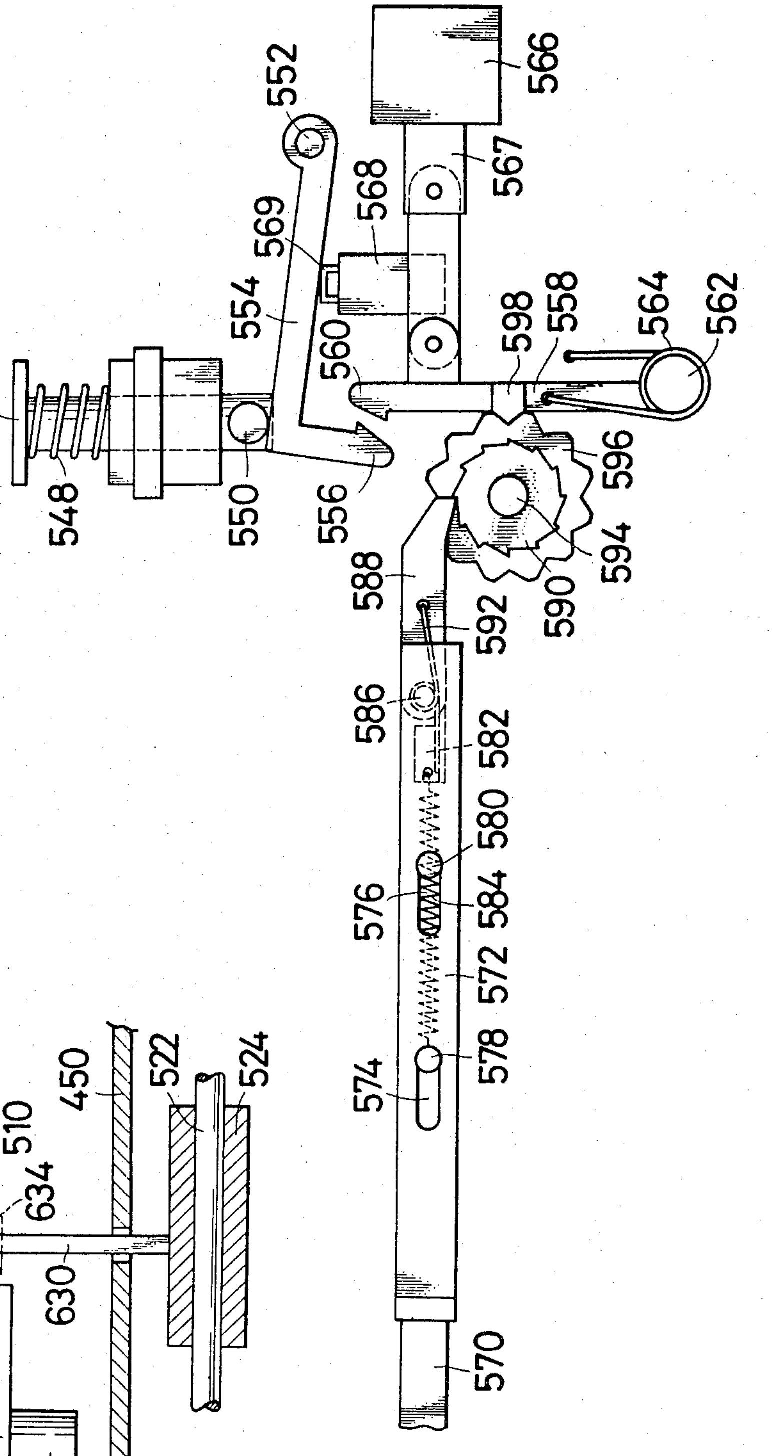
FIG. 27 is a front view of the actuating click member and the vicinity of the retaining click member.

FIG. 27 is a front view of the actuating cog member 554 and the vicinity of retaining cog member 558. Referring also to FIG. 26, a moving piece 570 is installed in the machine frame and is free to move in the longitudinal direction. One end of the moving piece 570 contacts the end of contact piece 544, and the other end contacts the end of feed piece 572. Pins 578 and 580 linked to the machine frame 2 are loosely inserted into elongated holes 574 and 576 extending in the longitudinal direction of the feed piece 572, so that the feed piece 572 can be moved in the longitudinal direction. One end of spring 584 is linked to a lug 582 on the feed piece 572, and the other end is linked to the pin 578 which is part of the machine frame 2. The spring 584 provides the feed piece 572 with a biasing force in the retreating direction, that is, in the leftward direction in FIGS. 26 and 27. A feed cog 588 is connected to the other end of the feed piece 572 by means of pin 586. This feed cog 588 is engaged with the teeth of ratchet wheel 590. A torsion spring 592 inserted on this pin 586 presses the feed cog 588 towards the ratchet wheel 590. The lug 582 which is in one body with the feed piece 572 also works to limit the revolving angle displacement of the feed cog 588 due to the torsion spring 592. The ratchet wheel 590 is rotatably mounted around a shaft 594 connected to the machine frame 2. The ratchet wheel 590 is in one body with a gear 596, and has the same number of teeth as the gear 596. The teeth of the gear 596 are engaged with a projection 598 attached to the retaining cog member 558.

When the number of copies set by the display drums 12 and 14 is terminated to "00," projections 528 and 530 of the count reset detecting member 524 are engaged with the recesses 532 and 534, thus revolving in the direction of arrow 591. As a result, the swing lever 538 revolves around the pin 536, and the contact piece 544 moves in the direction of arrow 595. Thus, when the support 64 returns to the reset position 142 in the direction of arrow 144 at the returning speed at the end of exposure, the contact piece 542 contacts the contact piece 544. Thereby, the contact piece 544 revolves around the pin 546, and the moving piece 570 moves in the direction of arrow 593, causing the feed piece 572 to move in the direction of arrow 597. Consequently, the feed cog 588 causes the ratchet wheel 590 to revolve by an amount corresponding to one tooth of the gear 596, and at the same time, the gear 596 rotates by the amount of one tooth. Therefore, the projection 598 is instantly displaced by the gear 596 in the rightward direction in FIG. 27, so that the retaining cog 560 of cog member 558 is disengaged from the swing cog 556. Then, the actuating cog member 554 is pushed up by the spring force of the actuator 569 of the switch 568, and the print button 16 is biased by the spring 548, so that the original state of being ready for copying is restored.

When the print button 16 is pressed, the actuating cog member 554 is pushed down to cause the operating cog 556 to be engaged with the retainer cog 560, so that the actuator 569 of the print switch 568 is kept depressed.

Figure 28:
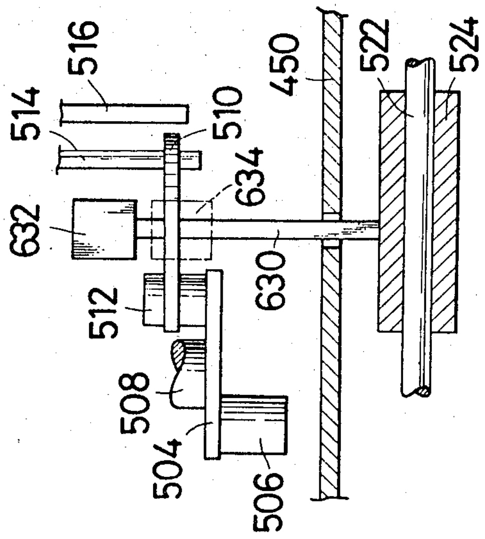
FIG. 28 is a cross sectional view of the vicinity of the angle enlarging piece.

FIG. 28 is a cross section of the vicinity of the angle enlarging piece 504. When the display drums 12 and 14 indicate "00," further count-down is prevented by the structure described hereafter. A count release piece 632 is attached to the count reset detecting member 524 through a connecting rod 630. The count release piece 632 is arranged ahead of the projection 512 in the running direction 88. While the projection 528 and 530 of the count reset detecting member 524 are not fitted into the recesses 532 and 534 of display drums 12 and 14, that is, while neither 12 nor 14 is "0", the count release piece 632 is positioned outside the projection 512. Therefore, a count-down operation can be performed.

Figure 29:
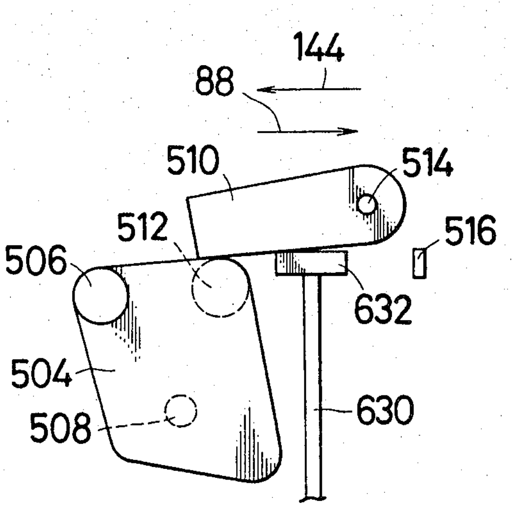
FIG. 29 is a longitudinal sectional view of the count release piece.

When both display drums 12 and 14 are set to "0," the count release piece 632 is placed parallel with the projection 512. At this time, the position of count release piece 632 is indicated by dotted line 634 in FIG. 28. When the moving piece 510 reaches the final end in the running direction 88, as shown in FIG. 29, the moving piece 510 is kept pushed up to touch the projection 512, thereby preventing the angle enlarging piece 504 from rotating in cooperation with the stopper 516. By this arrangement, further count-down from "00" can be thus prevented.

Referring to FIG. 12 which illustrates the electric circuitry of the electrostatic copying apparatus of this invention, the print switch 568 possesses a contact point 568*a* which conducts when the print button 16 is pressed to engage the cogs 556 and 560 together, and a contact point 568*b* which conducts when the engagement of 556 and 560 is released. The contact 568*a* is connected in series to the motor 54. The contact 568*a* is connected in series to a switch 614 and discharge detection switch 124, and is further led to relay R1. The switch 614 is a microswitch which is instantaneously turned on by the moving member 136 in returning motion. The relay R1 is furnished with a self-hold relay contact R1-1, relay contact R1-2 connected in series to contact 568*a*, and relay contact R1-3 connected in series to paper jamming indication lamp 19 which is connected to contact 568*b*. The discharge detection switch 124 is made to conduct while there is no paper between the discharge rollers 118 and 118' and the actuator 126 is not operating, and cut off when there is paper between the roller with the actuator 126 operated.

When the print button 16 is pressed to make the print switch 568 connected with contact 568*a*, the motor 54 is driven. In a copying operation, when the moving member 136 makes the switch 614 conduct while returning to the rest position after exposure, the copying paper remains between the discharge rollers 118 and 118' in normal time as far as jamming of paper is not caused within the apparatus, so that the discharge detection switch 124 is cut off. Therefore, the relay R1 is not excited, and the copying operation can be continued.

Suppose paper jamming occurs within the apparatus during a copying operation. The print switch 568 closes the contact 568*a*, and the moving member 136 makes the switch 614 conduct when returning. At this time, the copying paper does not reach the discharge rollers 118 and 118', so that the discharge detection switch 124 is kept closed. This excites the relay R1, which is allowed to self-hold by means of the contact R1-1. Also, since the contact R1-2 of relay R1 is made to conduct, the magnetic plunger 566 is excited. Then, resisting the force of the torsion spring 564, the plunger 567 oscillates the retaining cog member 558 to disengage the actuating cog 556 from the retaining cog 560. As a result, the print switch 568 cuts off the contact 568*a* and is connected to the contact 568*b*, causing the motor 54 to stop. At this time, since the relay R1 remains excited by the self-hold contact R1-1, the contact R1-3 remains closed, thereby keeping the jamming indication lamp 19 illuminated. In this example, the length of paper passage is selected so that the copying paper is completely discharged onto the copy tray 122 by the discharge rollers 118 and 118' when the moving member 136 has returned to the rest position.

Figure 30:
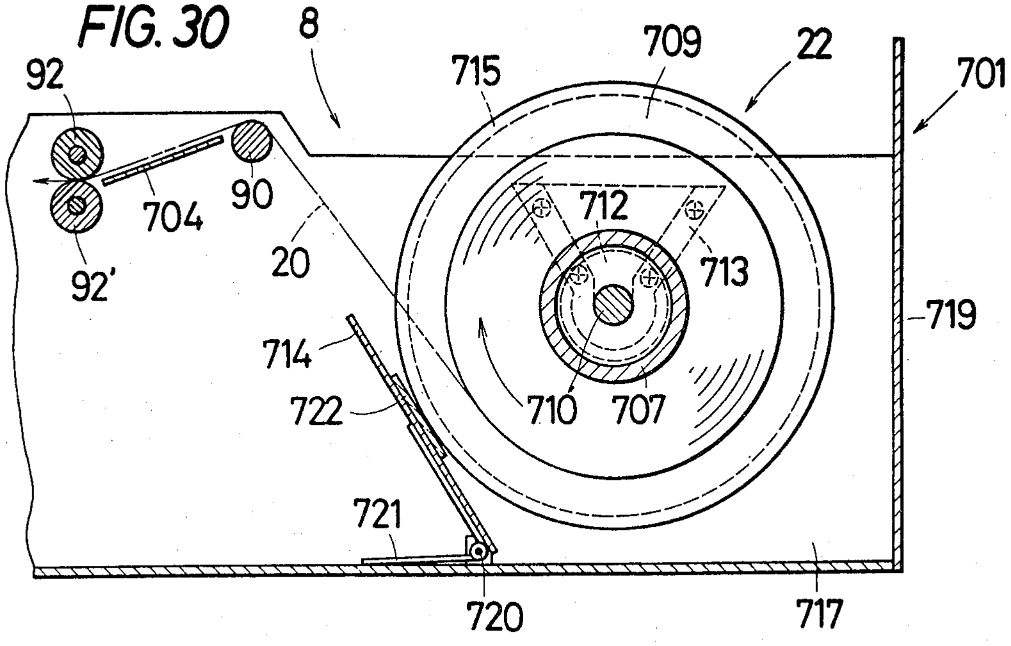
FIG. 30 is a longitudinal sectional view of the paper feeding device.
Figure 31:
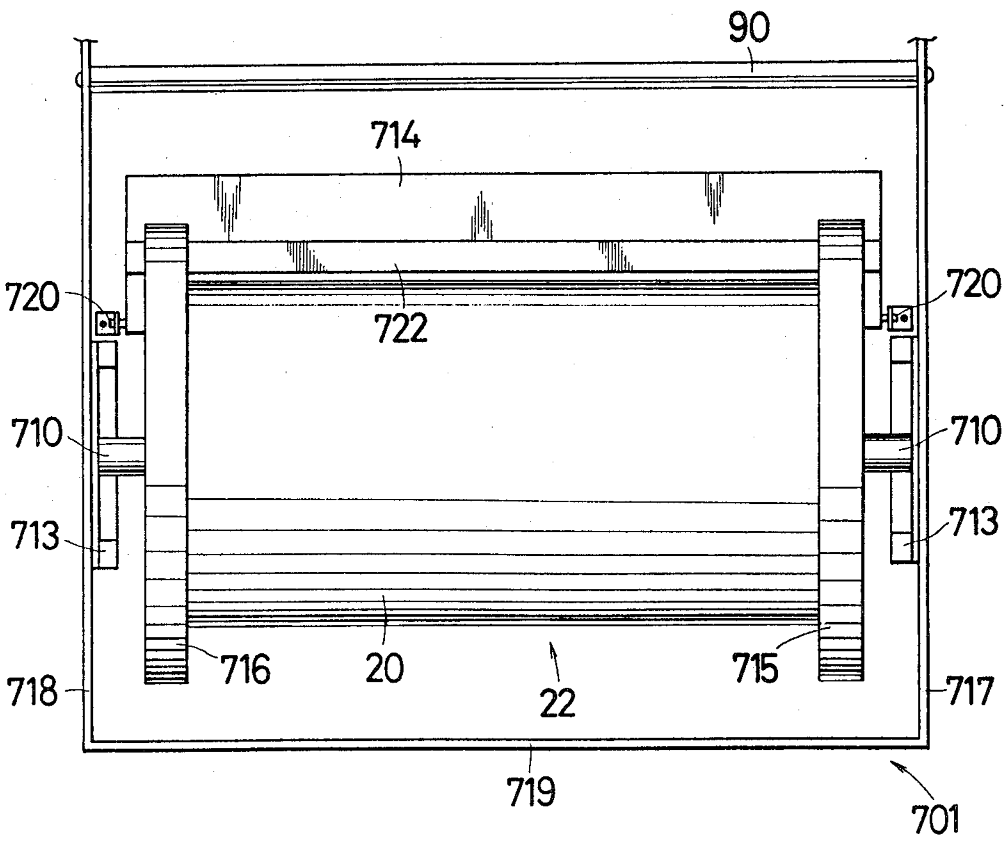
FIG. 31 is a plan view of the paper feeding device.
Figure 32:
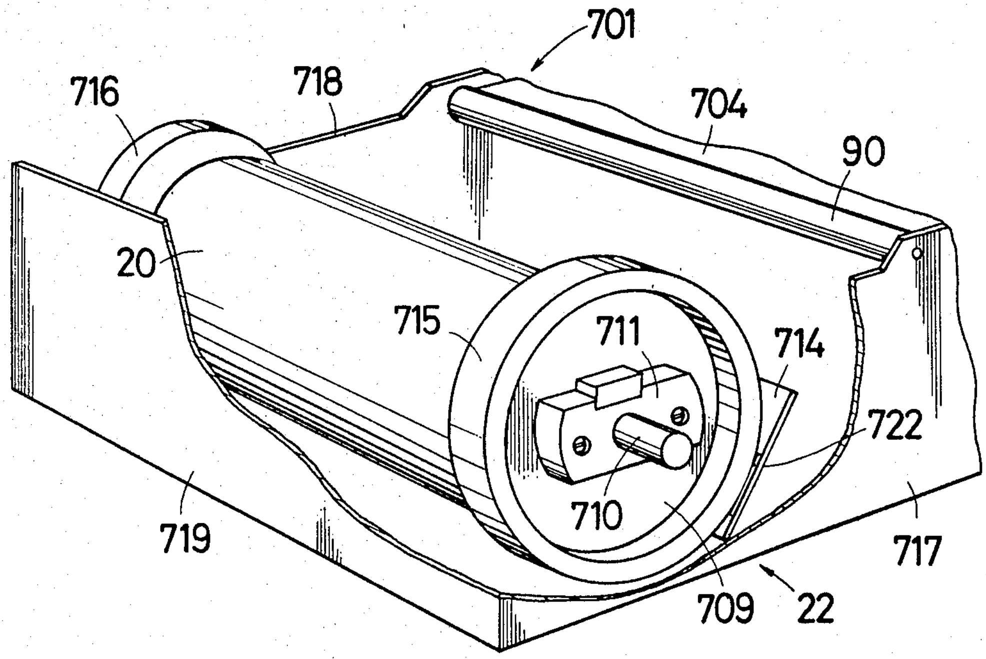
FIG. 32 is a perspective view of the paper feeding device.

FIG. 30 is a sectional view of the paper feeding device 8, FIG. 31 is a plan view thereof, and FIG. 32 is a perspective view thereof. The body 701 of the paper feeding device 8 can be drawn out of the copying apparatus main body (not shown). A roll of copying paper 20 can be changed or loaded by drawing the body 701 of the paper feeding device 8 out of the copying apparatus. The body 701 has uncurling roller 90, guide plate 704 and a pair of paper feed rollers 92 and 92' in this order on both sides thereof. The roll of copying paper 20 is drawn out of the pair of paper feed rollers 92 and 92' which are rotated by the motor, and is cut to a length suitable for the original document size by the paper cutting device 24. At this time, the feed rollers 92 and 92' are stopped.

The roll of copying paper 20 is wound around a cylindrical body 707, for example a cardboard tube, and is detachably held by a holder 22. The holder 22 comprises a pair of transparent support plates 709, made of for example synthetic resin, to support the opposite ends of the roll of copying paper 20, cental axis lever 710 which penetrates through the cylindrical body 707 and support plates 709 on the same axial line and projects outside the plates 700, and stopper 711 which attaches the support plates 709 and the central axis lever 710 in a manner to permit engagement and release. Support plate 709 has a larger diameter than the maximum outside diameter of the unused roll of copying paper 20 that can be housed within the holder, and in the central part thereof is formed an inward push part 712 which is inserted into both ends of the cylindrical body 707 to align the cylindrical body 707 and the support plates 709 on an axial line. The opposite ends of the central axis lever 710 are rotatably and detachably connected to central axis lever support members 713 which are provided on both sides (right and left sides in FIG. 31) of body 701 of the paper feeding device.

At the circumferential ends of the support plates 709 are formed short cylindrical grips 715 and 716 project outwards along the axial line of the support plates 709. Opposite side plates 717 and 718 of paper feeding device body 701 are so constructed that the top parts of grips 715 and 716 are projected above them when the holder 22 is settled in the body 701. The end plate 719 of the paper feeding device body 701 is located higher than the support plates 709 of the holder 22. Thus, when the main body 701 is stored in the copying apparatus, the roll of copying paper can be prevented from being exposed to light leaking through a gap between the machine frame 2 and the end plate 719.

The paper feeding device body 701 is provided with a braking member 714 which frictionally contacts the outer surfaces of both grips 715 and 716. This braking member 714 is rotatably installed by pin 720 which is attached to the paper feeding device body 701, and is biased toward the grips 715 and 716 by means of torsion spring 721. A cork material 722 is fixed to the side of the braking member 714 facing grips 715 and 716 to provide a braking force.

When the rotation of paper feed rollers 92 and 92′ is stopped at the end of a copying operation, the rotation of the holder 22 is stopped by a braking force due to the frictional contact between the grips 715 and 716 and the braking member 714. Moreover, the braking member 714 is biased toward the circumferences of grips 715 and 716, and its braking force always remains constant irrespective of reduction of the diameter of the roll paper 20 during operation. Thus, the copying paper 20 always can be pulled with a constant braking force, so that the paper can be sufficiently uncurled. Also, the stop of the copying paper and of the holder 22 can be performed simultaneously.

If the support plate 709 is made of a transparent plate as in the present example, the reeling condition of the copying paper can be seen from exterior of the plate 709. Therefore, the amount of paper remaining can be checked by drawing the paper feeding device body 701 from the machine frame 2.

The roll of paper 20 can be replaced with a new roll by lifting the grips 715 and 716 of the holder 22 upwards and taking out the holder 22. What is more, since the grips 715 and 716 are of short cylindrical form, removal is easy wherever the holder 22 is stopped. In addition, since the tops of grips 715 and 716 project from the top of the side plates 717 and 718 of the body 701 as shown in this example, no axial space for access of fingers for removal is required, so that the paper feeding section of the copying apparatus for accommodating the holder 22 can be of a compact design. Therefore, even a holder 22 which is heavy with a new roll of copying paper 20 can be easily assembled into the paper feeding device body 701 simply by holding its grips 715 and 716.

As a substitute means, grips may be provided by forming projections on the support plates 709 at equal intervals in the peripheral direction to project axially outwards therefrom.

Thus, by providing grips 715 and 716 on the holder 22, replacement of rolls of copying paper different in size also will be very easy.

Figure 33:
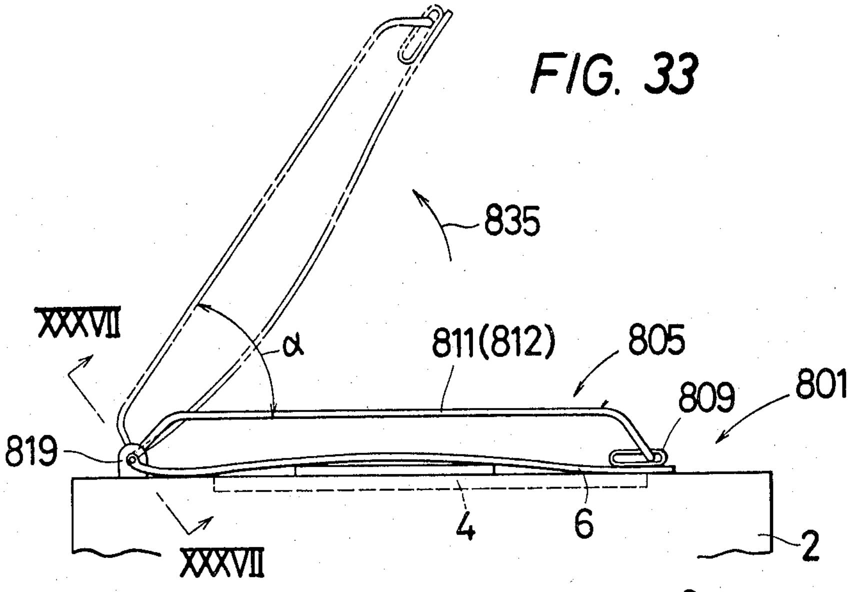
FIG. 33 is a side view of the original document cover lid of FIG. 1.
Figure 34:
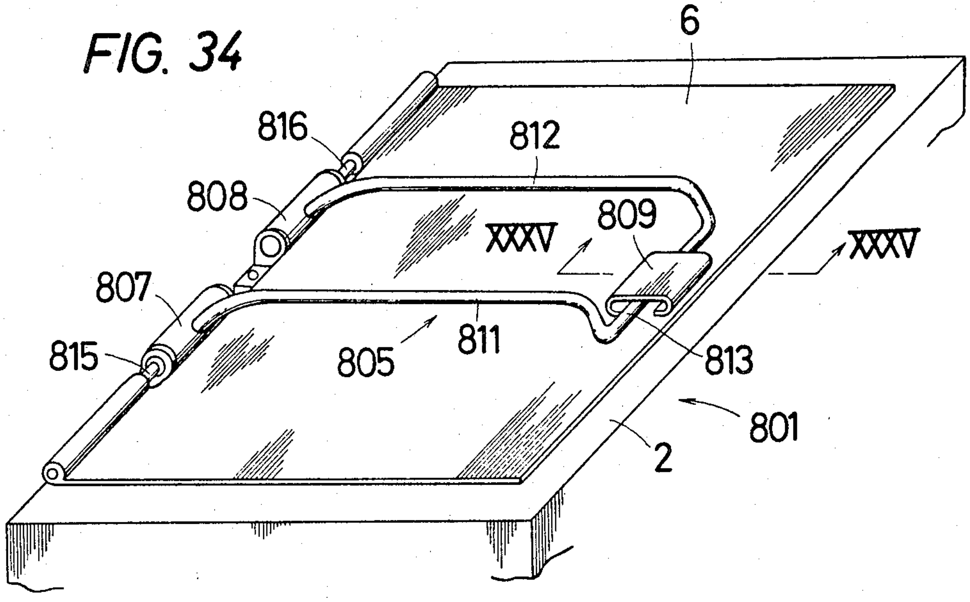
FIG. 34 is a perspective view of the original document cover lid.
Figure 35:
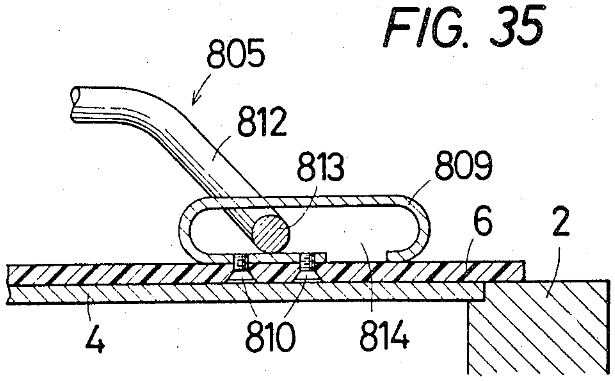
FIG. 35 is a sectional view taken along the line XXXV—XXXV of FIG. 34.

FIG. 33 is a side view of the original document cover lid 6, FIG. 34 is a perspective view thereof, and FIG. 35 is a sectional view along line XXXV—XXXV of FIG. 34. The electrostatic copying apparatus 801 is designed to move part of the optical device (not shown) horizontally in the crosswise direction of the copying apparatus (perpendicular to the plane of FIG. 33) to transfer the image of the original onto the moving paper through slit exposure. Atop the machine frame 2 is installed a transparent plate 4 to place the original document thereon. Beneath the transparent plate 4 is provided a part of the movable optical device. The original document put on the transparent plate 4 is covered with the original document cover lid 6, made of for example rubber, which is supported by a support member 805. This support member 805 is attached to hinges 807 and 808 provided at the end of the rear side (the left side in FIG. 33) of the machine frame 2. Thus, the support member 805 is, like the near side (the right side in FIG. 33) of the machine frame 2 opened as shown by the dotted lines in FIG. 33, by pivoting upwards from the transparent plate 4 within the range of revolving angle $\alpha$, for instance, 45 degrees.

In the upper near part of the original document cover lid 6 is screwed, by means of screws 810, a mounting member 809 having the function of a handle. The mounting member 809 is bent in an arc form at both ends to extend along the original document cover lid 6 at right angles to the crosswise direction of the machine frame 2. The support member 805 is formed roughly in a U-shape with arms 811 and 812 curving upwards and having a round cross section and a connecting piece 813 having a round cross section joining arms 811 and 812 together. The support member 805 should have a relatively large diameter in the case of a large-sized copying apparatus to sufficiently support the original document cover lid 6. The connecting piece 813 is fitted to the mounting member 809 in a manner allowing piece 813 to move freely in the longitudinal direction of the machine frame 2 within the mounting member 809. The end part of mounting member 809 situated at the side of original document cover lid 6 and not connected by the screws 810 provides a gap 814 for inserting the connecting piece 813. The gap 814 is shut off by the flexible original document cover lid 6. As shown in FIG. 33, if the original 802 is bulky, such as a book, since the connecting piece 813 of the support member 805 can be moved along the mounting member 809, the original document cover lid 6 can be bent along the contour of the original 802. Thus, the original 802 is covered so that no light leaks from the optical device. When the support member 805 is revolved upwards, the mounting member 809 is allowed to move along the connecting piece 813 due to the gravity of the cover lid 6, so that the connecting piece 813 comes in contact with the end of the arc form of the mounting member 809. Thereby, the connecting piece 813 will not drop off through the gap 814. The free ends of the arms 811 and 812 are connected to the hinges 807 and 808, respectively. The rear end of the cover lid 6 is supported by the revolving shafts 815 and 816, which are, in turn, fitted into the hinges 807 and 808 on the same axial line.

Figure 36:
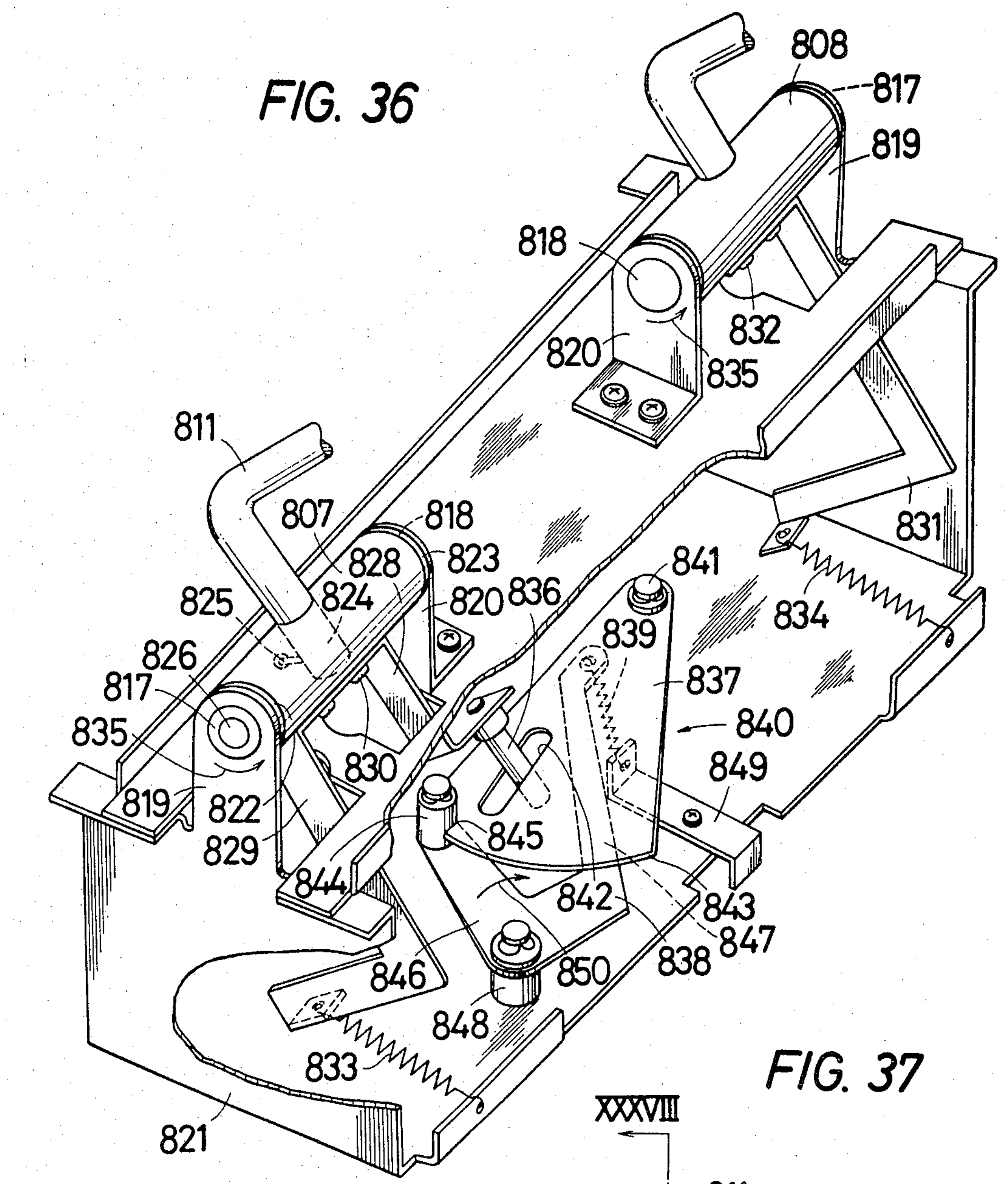
FIG. 36 is a perspective view showing the mechanism for revolving and holding the original document cover lid.
Figure 37:
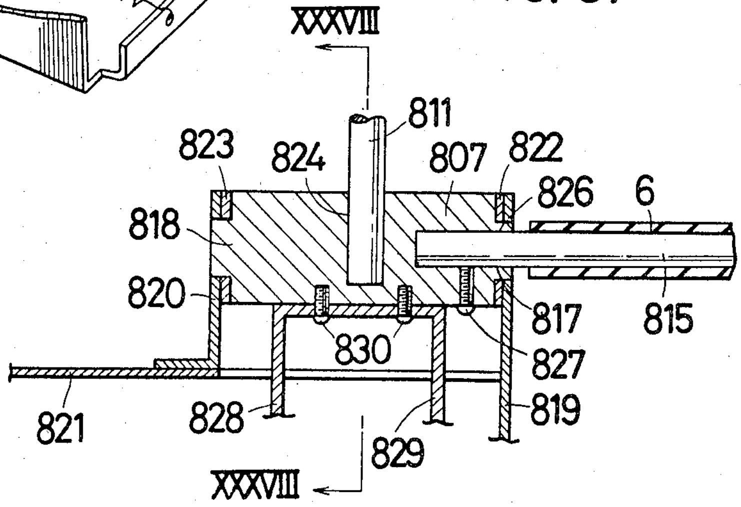
FIG. 37 is a sectional view taken along the line XXXVII—XXXVII in FIG. 33.
Figure 38:
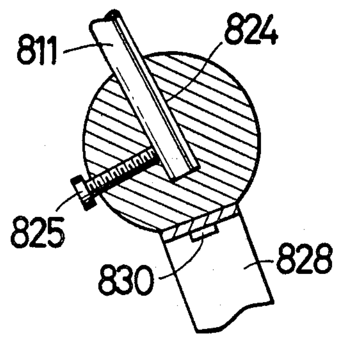
FIG. 38 is a sectional view taken along the line XXXVIII—XXXVIII in FIG. 37.

FIG. 36 is a perspective view of the mechanism to revolve and hold the original document cover lid 6 which is mounted on the support member 805. FIG. 37 is a sectional view along line XXXVII—XXXVII in FIG. 33. FIG. 38 is a sectional view along XXXVIII—XXXVIII in FIG. 37. The hinges 807 and 808 having round cross sections are provided with projections 817 and 818 having round cross sections and projecting outward in the axial direction. The projections 817 and 818 of the hinges 807 and 808 are rotatably fitted to a pair of brackets 819 and 820. The brackets 819 and 820 are in one body with a support mechanism 821 located in the rear side of the machine frame 2. Between the hinges 807, 808 and the brackets 819, 820 are inserted sliding rings 822 and 823 having a low coefficient of friction in order to enable the hinges to revolve smoothly. In the central part along the axial line of hinge 807, a fitting hole 824 to accept one arm 811 of the support member 805 is formed through the midpoint of the diameter of hinge 807. The position of the fitting hole 824 is selected so that the original document cover lid 6 is opened 45 degrees when the hinge 807 is moved to the maximum angle as shown in FIG. 36, and that the original document cover lid 6 is placed on the transparent plate 4 when the hinge 807 is not rotated. The arm 811 inserted into the fitting hole 824 is fixed by screw 825. In the projection 817 extending outwards in the axial direction of the hinge 807 is formed a fitting hole 826 for inserting revolving shaft 815 up to the midpoint in the axial direction of the hinge 807. The revolving shaft 815 fitted into the fitting hole 826 is secured by screw 827. The other hinge 808 is formed in a manner similar to the hinge 807, and the other arm 812 of the support member 805 and the revolving shaft 816 are inserted and secured in the same manner.

In the lower part of the hinge 807 are attached support pieces 828 and 829, by means of screws 830. Pieces 828 and 829 extend at right angles to the rotational axial line of the hinge 807 and in the downward direction penetrating through the main body 821 towards the front side of the machine frame 2. These support pieces 828 and 829 are arranged parallel to each other at proper intervals in the axial direction of the hinge 807. The outward support piece 829 in the axial direction of the hinge 807 is bent towards the rear side of the machine frame 2. In the outward lower part of the axial direction of the other hinge 808, a support piece 831 is attached by means of screws 832. The support piece 831, like 829, is formed roughly in an L-shape, and extends towards the front side of the machine frame 2. At the free ends of the support pieces 829 and 831 are attached ends of springs 833 and 834, of which the other ends are connected to the front side of the body 821. By the force of springs 833 and 834, the support pieces 829 and 831 are made biased to the front side of the machine frame 2. Therefore, the hinges 807 and 808 are biased so as to rotate in the direction of arrow 835.

One end of a stopping bar 836 having a round cross section is attached to the free end of the support piece 828 of the hinge 807. The stopping bar 836 slopes downwards in the extended direction of the support piece 828. Underneath the stopping bar 836 are provided a revolving plate 837 having a nearly sector shape, and oscillating lever 838 located below revolving plate 837, and a spring 839 which urges the oscillating lever 838 to a side of revolving plate 837. These three elements form a supporting member 840. The revolving plate 837 is rotatably mounted at the apex of the sector thereof by pin 841 and has an elongated hole 842 which extends in the radial direction. The free end of the stopping bar 836 is inserted into this oval hole 842. An arc-shaped surface or edge 843 of the revolving plate 837 has formed in a side thereof toward the rear side of the main body 821 a semicircular notch 845 for the insertion of rotor or pin 844 which is mentioned later. Below the revolving plate 837 is horizontally positioned the oscillating lever 838 which is equipped with two arms 846 and 847. The oscillating lever 838 is free to rotate horizontally and is supported by means of pin 848 attached to the main body 821 at the base of arms 846 and 847 at a position outside the radial dimension of the revolving plate 837. The rotor 844 projecting higher than the revolving plate 837 is rotatably fitted to the free end of one arm 846 which extends roughly along the arc-shaped edge 843 of the revolving plate 837. The other arm 847 extends beneath the revolving plate 842 at the opposite side of the arm 846 with respect to the elongated hole in the revolving plate 837. The free end of the arm 847 is fitted to one end of spring 839 the other end of which is fixed to a support piece 849 connected to the body 821. By the force of the spring 839, the oscillating lever 838 is urged in the direction of arrow 850. Thus, the rotor 844 is urged into contact with the arc-shaped edge 843 of the revolving plate 837.

As shown in FIG. 33, when the original 802 is covered with the original document cover lid 6, the hinges 807 and 808 are rotated in the direction reverse to the arrow 835, against the force of the springs 833 and 834, by gravity due to the weight of the support member 805 and the cover lid 6. Thus, the force to revolve the hinges 807 and 808 in the direction of arrow 835 using the force of the springs 833 and 834 is selected to be a little smaller than the force to rotate the hinges 807 and 808 in the direction reverse to the arrow 835 by gravity due to the weight of the support member 805 and the cover lid 6. Therefore, unless the support member 805 is moved upwards with a slight force in addition to springs 833 and 834, it will not be pushed up only by the force of the springs 833 and 834.

Figure 39:
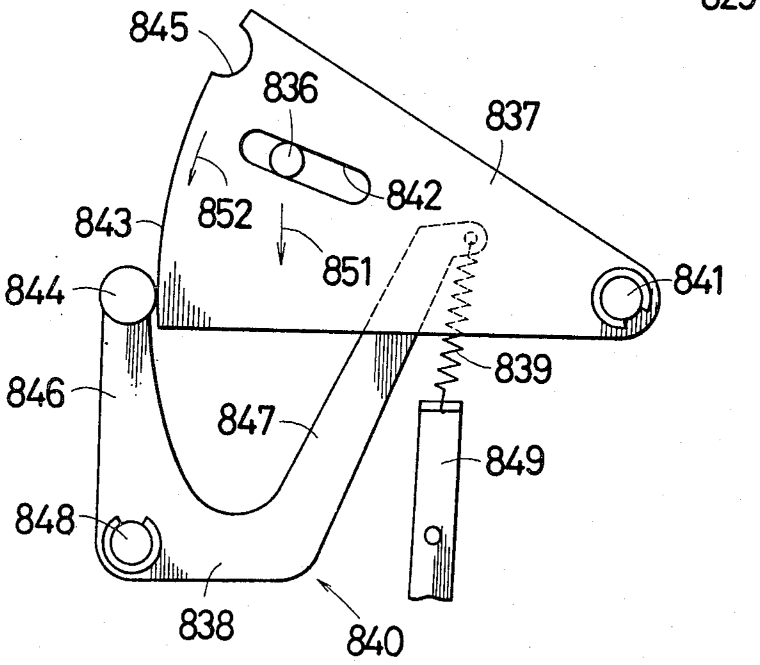
FIGS. 39 and 40 are plan views showing the supporting member for the original document cover lid.

While the original document cover lid 6 is covering the transparent plate 4, the stopping bar 836 is revolved in the direction reverse to the arrow 835, together with the hinge 807, due to which the revolving plate 837 is also revolved towards the rear side of the main body 821 as shown in FIG. 39. Hence, the rotor 844 urged toward the arc-shaped edge 843 by means of spring 839 is positioned frontwardly of and spaced from notch 845.

Figure 40:
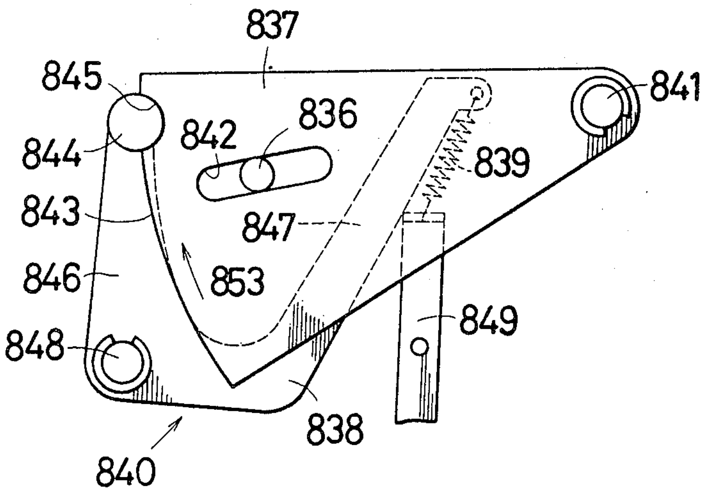

When revolving the original document cover lid 6 upwards in order to place the original document 802 on the transparent plate 4, the support member 805 is pushed up by hand. At this time, since the support pieces 829 and 831 and hinges 807 and 808 are pulled in the direction of the arrow 835 by springs 833 and 834, the support member 805 and the original document cover lid 6, even when they are heavy, can be moved with a slight normal force. The revolution of the support member 805 in the direction of the arrow 835 causes the stopping bar 836 to turn in the direction of arrow 851 (FIG. 39). In turn, the rotation of this stopping bar 836 causes the revolving plate 837 to revolve around the pin 841 in the direction of the arrow 852. Consequently, the arc-shaped edge 843 of the revolving plate 837 moves in contact with the rotating rotor 844. When the support member 805 is turned by $\alpha$ degrees, the rotor 844 fits into the notch 845 in the arc-shaped edge 843 as shown in FIG. 40. As a result, the support member 805 is fixed at the maximum revolving position of angle $\alpha$, so that the original document cover lid 6 will not return in the direction reverse to the arrow 835 even if the support member 805 is released.

To cover the original again with the cover lid 6 when the support member 805 is fixed at the maximum revolving position, the support member 805 should be turned in the direction reverse to the arrow 835 by hand, against the force of the springs 833 and 834. Then, the revolving plate 837 is permitted to turn in the direction of arrow 853 in FIG. 40. In consequence, the rotor 844 is released from the notch 845 in FIG. 40, and slides along the arc-shaped edge 843 to return to the original position shown in FIG. 39.

Figure 41:
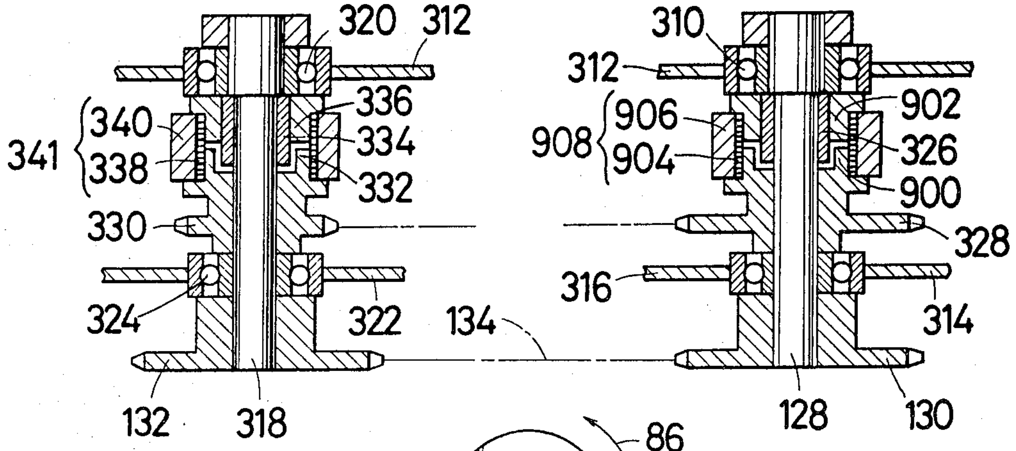
FIG. 41 is a sectional view of another embodiment of the drive mechanism according to this invention.

In the example demonstrated in FIG. 16, although the projector 40 and the moving member 136 are designed to return at a higher speed than the exposure speed after the exposure process, the next copying operation cannot be commenced before the copying paper is completely discharged from the apparatus, so that the entire copying time will be very long especially when multiple copies are handled continuously. A drive mechanism to solve this problem is shown in FIG. 41. The example in FIG. 41 is similar to that in FIG. 16, and corresponding components are marked with the same reference numbers and their explanations are omitted in this section. The feature of special note is as follows. With respect to the rotary shaft 128, a spring is loosely fitted between a boss 900 of the first drive sprocket wheel 328 and an input end 902 of the first one-way clutch 326, and one end of a spring 904 is linked to the input end 902 and the other end is linked to a ratchet wheel 906 which is loosely fitted to the rotary shaft 128. The spring 904 and the ratchet wheel 906 compose a so-called wrap spring clutch 908.

Figure 42:
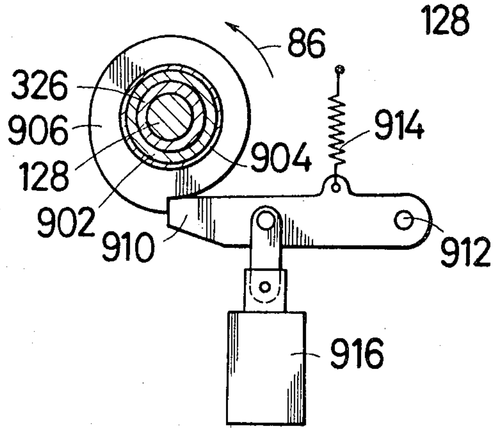
FIG. 42 is a sectional view showing the ratchet wheel of FIG. 41.

FIG. 42 is a sectional view of the vicinity of the rotary shaft 128 seen at a right angle to the axis thereof. A cog 910 can be engaged with the ratchet wheel 906, and this cog 910 is attached to the machine frame 2 by means of pin 912. The cog 910 is urged by spring 914 in a direction to be engaged with the ratchet wheel 906. A magnetic plunger 916, when excited, pulls in the cog 910 against the force of the spring 914 to disengage it from the ratchet wheel 906.

Figure 43:
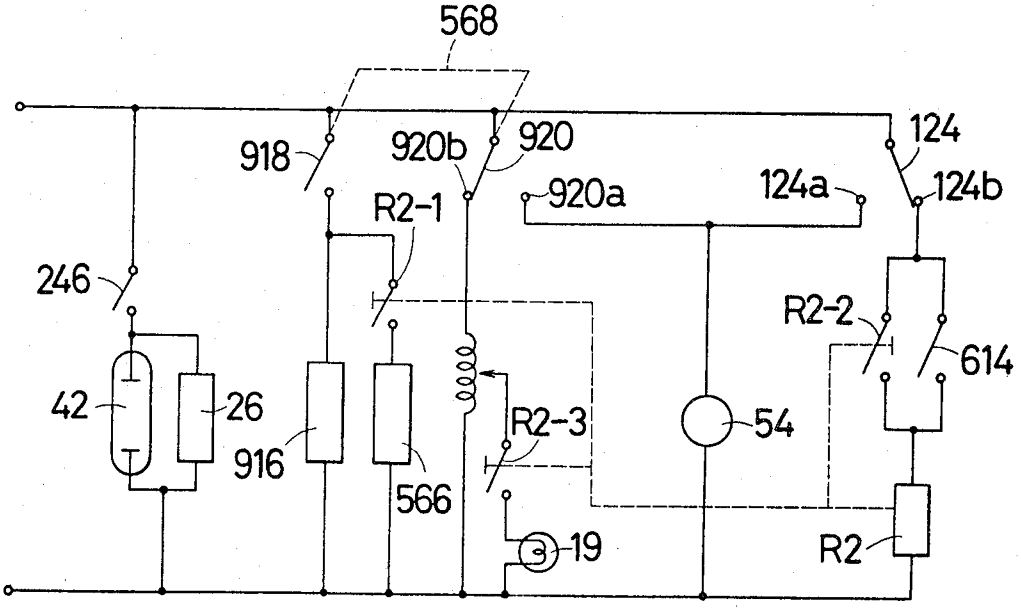
FIG. 43 is an electric circuit diagram of the drive mechanism shown in FIGS. 41 and 42.

FIG. 43 is an electric circuit diagram of the drive mechanism shown in FIGS. 41 and 42. In this example, the print switch 568 includes two circuit contacts 918 and 920. The contact 918 is closed when the print button 16 is depressed and the actuator 569 is lowered. The magnetic plunger 916 is connected in series to the contact 918, and contact R2-1 of relay R2 and the magnetic plunger 566 are also connected in series thereto. The contact 920 can be selectively closed at 920*a* and 920*b*. The contact 920*a* is closed when the actuator 569 of the print switch 568 is lowered. The motor 54 is connected in series to this contact 920*a*. The discharge detection switch 124 is connected to the contact 124*a* as shown in the illustration when the paper is not held by the discharge rollers 118 and 118', whereas it is connected to the contact 124*b* when paper exists between 118 and 118'. The switch 614 connected in series to the contact 124*b* is instantly closed when the moving member 136 returns. The relay R2 has a self-hold contact R2-2 which is connected in parallel to the switch 614. The contact R2-3 which is closed by the excitation of relay R2 is connected in series to the contact 920*b* and the paper jamming indication lamp 19 through an autotransformer.

When the print button 16 is set down, the cogs 556 and 560 are engaged with each other, keeping the contact 918 of the print switch 568 closed, while the contact 920 is closed at 920*a*. Accordingly, as the motor 54 is driven, the magnetic plunger 916 is excited, and the cog 910 is released from the ratchet wheel 906. Consequently, the power from the first drive sprocket wheel 328 to drive the chain 134 at the exposure speed is transmitted from the input end 902 through the wrap spring clutch 908, up to the rotary shaft 128 via the first one-way clutch 326, thereby rotating the sprocket wheel 130 at the exposure speed.

At the end of exposure, the moving member 136 revolves the de-energization detecting member 22 in the clockwise direction in FIG. 10. As a result, as mentioned previously, the cog 352 of the cog member 348 is released from the ratchet wheel 340, and it is kept free. This causes the torque of the second drive sprocket wheel 330 to be transmitted to the rotary shaft 318 through the wrap spring clutch 341 and the second one-way clutch 334. Then, the sprocket wheel 132 is permitted to rotate at a relatively high returning speed. Since the rotating speed of the rotary shaft 128 at this time is faster than the speed suited to the exposure running of the first drive sprocket wheel 328, the first one-way clutch 326 prevents the torque of the rotary shaft 128 from being transmitted to the first drive sprocket wheel 328. Just before the moving member 136 returns to the rest position 142, the projection 362 provided on the chain 134 is brought into contact with the projection 360 of the cog 358. As a result, the cog 358 is revolved, so that the cog 354 is disengaged from the cog 358, thereby causing the cog 352 to be engaged with the ratchet wheel 340.

When the moving member 136 returns to the rest position 142, the depression of the print button 16 is reset, and the contact 918 of the print switch 568 is cut off, thereby demagnetizing the magnetic plunger 916. This causes the cog 910 to be engaged with the ratchet wheel 906, so that the wrap spring clutch 908 is cut off, which stops the rotation of the sprocket wheel 130 and the travel of the chain 134. The discharge detection switch 124 remains closed at contact 124*a*. After returning of the moving member 135 the discharge of copying paper out of the apparatus by means of the discharge rollers 118 and 118' is accomplished. Therefore, the motor 54 is driven when the moving member 136 returns to the rest position 142 with the contact 920 of the print switch 568 closed at 920*b* and opened at 920*a*.

Suppose the print button 16 is pressed to drive the motor 54 and paper jamming occurs within the apparatus and the copying paper fails to reach the discharge rollers 118 and 118'. Then, the contact 918 of the print switch 568 is closed and the contact 920 is closed at 920*a*. The discharge detection switch 124 is closed at 124*b*. If the switch 614 is closed while the moving member 136 is returning to the rest position 142, the relay R2 is excited and self-maintained by contact R2-2. At the same time, the contact R2-1 is closed, and the magnetic plunger 566 is excited. In consequence, the engagement of cogs 556 and 560 is released, and the contact 918 of the print switch 568 is cut off, while the contact 920 is opened at 920*a*. This causes the motor 54 to stop. When the contact 920 is closed at 920*b* and the contact R2-3 is closed due to the excitation of relay R2, the paper jamming indication lamp 19 to visually display the state of jamming will light up.

In the examples shown in FIGS. 41 through 43, during the period from the end of exposure until returning of the moving member 136 to the rest position 142, it is constituted as follows so that the projection 362 attached to the chain 134 can operate the switch 614 only when the copying paper 20 is oscillating the actuator 126 of the discharge detection switch 124. That is, the position of the switch 614 is determined according to the length of the paper passage from the front end of the exposure zone ld to the actuator 126 in the paper transfer direction. Thus, the discharge detection switch 124 is closed at 124*a* to keep the motor 54 energized, so that the copying paper 20 is discharged from the machine frame 2, and that the relay R2 is not excited even if the switch 614 is closed. Therefore, the jamming indication lamp 19 never gives faulty indication of paper clogging. In this arrangement, since the motor 54 is being energized during the period from returning of the moving member 136 to the rest position 142 until one complete discharge of copying paper, it is possible to transfer the paper for the next copying into the paper passage 36 by using the power of the motor 54. In other words, the next copying operation can be started continuously before the paper is completely discharged out of the machine frame 2 by means of the discharge rollers 118 and 118'. Thus the copying time required for multiple copies can be shortened.

Figure 44:
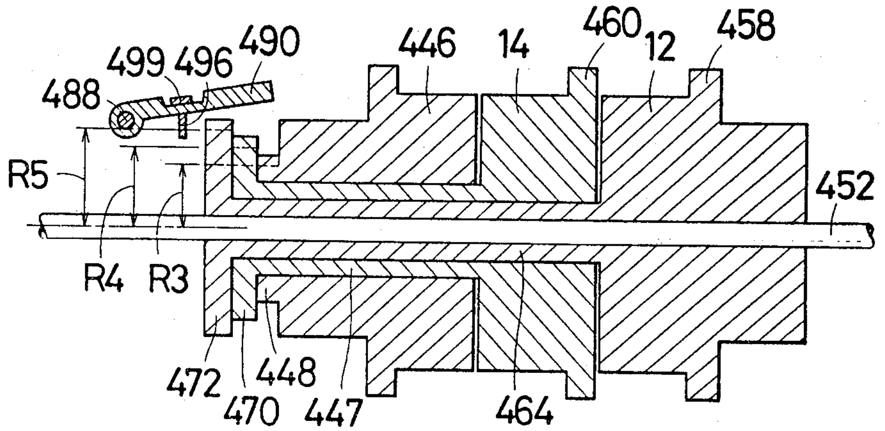
FIG. 44 is a sectional view showing another embodiment according to this invention.

Further, in accordance with an embodiment of this invention, as shown in FIG. 44, the counter has similar construction to the counter as described in connection with FIGS. 21 through 24, and corresponding elements are referred to by the same reference numerals. It is noted that a third display drum 446 for a third digit is coaxially provided together with the two display drums 12 and 14 for the first digit and the second digit respectively. Display drum 12 for the first digit is attached to ratchet wheel 472 through connecting sleeve 464. Display drum 14 for the second digit is attached to ratchet wheel 470 through connecting sleeve 447. On a side of the drum 446 for the third digit is integrally formed ratchet wheel 448. The ratchet wheel 448 has ten teeth identical in shape, of which the bottom radius R3 is equal to the bottom radius of one tooth of ratchet wheels 470 and 472. The bottom radius R4 of the remaining nine teeth of ratchet wheel 470 is larger than the tip radius of ratchet wheel 448. The bottom radius R5 of the remaining nine teeth of ratchet 472 is larger than the tip radius of ratchet wheel 470. These ratchet wheels 448, 470 and 472 can be commonly engaged by cog 490.

Since it is apparent that many changes could be made in the above construction and many widely different embodiments of the invention could be made without departing from the scope thereof, it is intended that all matter contained in the above description or shown in the accompanying drawings shall be interpreted as illustrative and not in a limiting sense.

What is claimed is:

1. A cutting apparatus for use in cutting copying paper sheets from a roll of copying paper in an electrostatic copying apparatus of the type including means for feeding copying paper along a copying paper path, a moving member moving along an exposure path during exposure of an original document to be copied, and a pivotally mounted paper cut detecting member positioned along the path of the moving member to be pivoted thereby to an actuated position, said cutting apparatus comprising:

a fixed blade immovably mounted on a frame, said fixed blade having a longitudinally straight cutting edge;

a rotary shaft mounted for rotation on said frame;

a rotary blade fixed to and carried by said rotary shaft for rotation therewith, said rotary blade having a spirally curved cutting edge adapted to cooperate with said straight cutting edge of said fixed blade to cut a copying paper sheet;

a boss member fixed to said rotary shaft;

a gear rotatably mounted about said rotary shaft, said gear rotating continuously during operation of the copying apparatus, said gear having a boss directed toward said boss member;

a ratchet wheel mounted about said boss member and said boss;

a spring positioned inwardly of said ratchet wheel and surrounding said boss member and said boss, said spring having a first end connected to said boss member and a second end connected to said ratchet wheel, said spring being wound to tighten in a rotating direction on said boss member and said boss;

said ratchet wheel having extending from diametrically opposite positions of the perphery thereof a control tooth and a rotation lock tooth;

a double cog member having a control cog and a rotation lock cog, said double cog member being mounted on said frame for pivotal movement between a first position, at which said control cog engages said control tooth thereby preventing tightening of said spring, and a second position, at which said control cog is out of engagement with said control tooth, thereby enabling said spring to tighten and transmit rotation of said gear to said rotary shaft and said rotary blade, and at which said rotation lock cog engages said rotation lock tooth after a predetermined rotation of said rotary blade and to prevent further rotation thereof;

the length by which said rotation lock tooth extends from the periphery of said ratchet wheel being greater than the length by which said control cog extends from said periphery, thus ensuring engagement of said rotation lock tooth by said rotation lock cog;

an inclinable member mounted on said frame and adapted to be moved to a pivoted position by the paper cut detecting member upon movement thereof to the actuated position thereof; and said double cog member having contact means, contacted upon movement of said inclinable member to said pivoted position thereof, for enabling pivoting of said double cog member from said first position thereof to said second position thereof.

2. An apparatus as claimed in claim 1, further comprising handle means mounted on said rotary shaft by means of a one-way clutch for achieving selective manual rotation of said rotary blade in one direction only.

* * * * *